(12) United States Patent
Spector et al.

(10) Patent No.: US 10,705,890 B2
(45) Date of Patent: Jul. 7, 2020

(54) SYSTEMS AND METHODS FOR PROVIDING AN INTERACTIVE MAP OF AN EVENT DRIVEN FUNDING PATH FOR AFFECTING A DIRECTED EVENT

(71) Applicant: Atalaya Capital Management LP, New York, NY (US)

(72) Inventors: Ben Spector, New York, NY (US); Drew Phillips, New York, NY (US)

(73) Assignee: ATALAYA CAPITAL MANAGEMENT LP, New York, NY (US)

( * ) Notice: Subject to any disclaimer, the term of this patent is extended or adjusted under 35 U.S.C. 154(b) by 0 days.

(21) Appl. No.: 16/100,169

(22) Filed: Aug. 9, 2018

(65) Prior Publication Data
US 2019/0179682 A1    Jun. 13, 2019

Related U.S. Application Data

(63) Continuation of application No. 15/839,804, filed on Dec. 12, 2017.

(51) Int. Cl.
*G06Q 40/00* (2012.01)
*G06F 9/54* (2006.01)
(Continued)

(52) U.S. Cl.
CPC .......... *G06F 9/542* (2013.01); *G06F 11/3003* (2013.01); *G06F 16/34* (2019.01);
(Continued)

(58) Field of Classification Search
None
See application file for complete search history.

(56) References Cited

U.S. PATENT DOCUMENTS

| 6,064,984 A * | 5/2000 | Ferguson | G06Q 40/00 705/35 |
| 2007/0239572 A1* | 10/2007 | Harris | G06Q 40/00 705/35 |

(Continued)

OTHER PUBLICATIONS

International Search Report and Written Opinion dated May 6, 2019 for International Application No. PCT/US2018/065274, filed Dec. 12, 2018.

*Primary Examiner* — Jason Borlinghaus
(74) *Attorney, Agent, or Firm* — Sheppard, Mullin, Richter & Hampton LLP

(57) ABSTRACT

A system including a non-transitory machine readable medium storing computer program instructions which, when executed by the processor, cause the system to: obtain directed event parameters defining a directed event, determine a plurality of secondary events and an occurrence sequence for the plurality of secondary events based on a plurality of event rules, issue one or more commands to trigger execution of such plurality of secondary events, monitor a completion status of the plurality of secondary events based on information obtained from the plurality of servers associated with the plurality of fund sources, and/or generate an interactive map providing a visual representation of a funding path, the funding path comprising the plurality of secondary events, the occurrence sequence for the plurality of secondary events, and a completion status of the plurality of secondary events.

27 Claims, 12 Drawing Sheets

(51) Int. Cl.
    *G06Q 40/02*     (2012.01)
    *G06Q 40/06*     (2012.01)
    *G06F 11/30*     (2006.01)
    *G06F 16/34*     (2019.01)
    *G06F 16/9038*     (2019.01)
    *G06F 16/901*     (2019.01)

(52) U.S. Cl.
    CPC ...... *G06F 16/9024* (2019.01); *G06F 16/9038* (2019.01); *G06Q 40/02* (2013.01); *G06Q 40/025* (2013.01); *G06Q 40/06* (2013.01)

(56) References Cited

U.S. PATENT DOCUMENTS

2014/0344141 A1* 11/2014 Cook ..................... G06Q 20/10
    705/39
2015/0095075 A1     4/2015 Breuer et al.

* cited by examiner

SYSTEMS AND METHODS FOR PROVIDING AN INTERACTIVE MAP OF AN EVENT DRIVEN FUNDING PATH FOR AFFECTING A DIRECTED EVENT

CROSS REFERENCE TO RELATED APPLICATIONS

This present application is related to and claims the benefit of U.S. application Ser. No. 15/839,804, filed on Dec. 12, 2017, which is incorporated herein by reference in its entirety.

TECHNICAL FIELD

The disclosed technology relates generally to transactional tools, and more particularly some embodiments relate to providing an interactive map of an event driven funding path for affecting a directed event.

BACKGROUND

Financial transactions (sometimes referred to herein as a directed events) can often involve a complex series of underlying steps including additional transactions (sometimes referred to herein as secondary events). For example, a directed event such as a simple request for an advance of $100,000 against an existing revolving credit facility may be followed by a series of calculations, credit facility balance inquiries, credit facility status inquiries, underlying investment analyses, creation of additional transaction requests, cash movements (via a bank wire, for example), and a number of authorizations and approvals throughout the process. Directed events and secondary events can often involve multiple accounts (operated by one or more financial institutions) held by multiple entities that interact with one another to effectuate the directed event. Further, certain steps that need to occur before, or after, a given directed event may be accomplished are often interrelated or interdependent based on, for example, timing, business relationships, funding conditions, business interests, entity preferences, approvals, and funding facility details, among other criteria. Current processes for handling and executing financial transactions require significant human involvement, often at or between each step along the process, leaving such processes vulnerable to human error and fraudulent activity.

In the example above, if an organization makes a request for a $100,000 draw on a revolving credit facility (a directed event involving a transaction where a lender and a borrower, each parties to the directed event, exchange $100,000 in cash for $100,000 in debt obligation according to the terms of a loan agreement), the current processes for handling such a request may involve a loan administrator assessing whether there are adequate funds in (or accessible to) the facility to satisfy the request (i.e., to determine whether the request is acceptable or within the limits of their business arrangement), followed by the loan administrator submitting a request seeking approval from a business approver (e.g., a CFO, a supervising officer, etc.).

Once the business approver approves the request (and consequently the directed event), an operations associate then must determine whether and which secondary events (e.g., additional transactions) are necessary to support (e.g., to provide funding for) the directed event. This may include identifying additional entities associated, directly or indirectly, with the parties to the directed event, determining the means (or event types) of funding the directed and/or secondary events, which may be via one or more debt instruments, equity instruments, or other instruments; and determining the amounts and sequences for each of the secondary events leading up to the directed event. Once determined, and with the underlying support of the business approver's approval, the operations associate then may need to prepare a wire package (a collection of anticipated wires, sometimes referred to herein as a wire batch) including one or more paper wires and/or electronic wires which, if executed, will effectuate the secondary events needed to accomplish the directed event, and may present the wire package for approval by a controller (via electronic approval over an online portal for the electronic wires, or via signature paper for paper wires). The controller may need to perform an audit or evaluation to ensure that the operations associate created the appropriate secondary events with the correct amounts, in the correct sequence, and that any and all other parameters relevant to the business relationship are accounted for as designed. Once approved, the operations associate must instruct execution of the payments in the approved amounts according to the approved sequence, which may involve checking that each payment has been executed by the bank before instructing the subsequent payment.

The foregoing is just one example of various steps that may occur in current practice. More complex transactions may involve far greater number of human interactions, approvals, and execution steps. Each step that involves human interaction or human input represents a point of vulnerability in current processes, both as to inefficiencies, inaccuracies, and most importantly fraudulent behaviors by humans that may compromise a transaction. Moreover, because many entities may be involved in the secondary events necessary to the directed event, any one of them may be responsible for the occurrence of an event necessary to the directed event, and consequently any one or more of those entities may be holding up the process for completing the directed event on account of the non-occurrence of one or more secondary events. Identifying what events remain uncompleted at any point in the process is critical to quickly identify where the transaction is being held up, and to making a determination about when or how the issue may be resolved. In many instances, a human analyst is required to monitor the completion of secondary events in a series of secondary events, and manually execute subsequent secondary events in the series before the directed event may actually take place. This often requires a user to repetitively access the various platforms of entities involved, review the status of a particular step or event that needs to take place for the transaction to continue in its progression, and in some instances, take additional steps to either urge the entity to complete a given secondary event, or find another entity (or another account held by such entity) that can substitute in and complete a substitute secondary event sufficient to support the directed event.

No current solution exists to effectively address the foregoing problems in a holistic manner that is secure and efficient. Furthermore, because so much of transactional business takes place in connection with various disparate internet platforms (e.g., banking platforms, underwriting platforms, etc.), several internet-centric problems have arisen that, to date, no integrated solution has been able to resolve. The present disclosure includes technology directed toward resolving many of the foregoing issues present in conventional systems and procedures.

BRIEF SUMMARY OF EMBODIMENTS

According to various embodiments, a system of the present disclosure may include one or more of a hardware processor, a communications circuit communicatively coupled to a plurality of servers associated with a plurality of fund sources, and a non-transitory machine readable medium storing computer program instructions which, when executed by the processor, cause the system to: obtain directed event parameters defining a directed event (in some embodiments, one or more directed event parameters are obtained from user input); determine a plurality of secondary events (which may include determining the amounts, event types, and/or fund sources) and an occurrence sequence for the plurality of secondary events, the occurrence of the plurality of secondary events in the determined occurrence sequence being sufficient to complete or accomplish the directed event (or sufficient to cause the directed event to be completed or accomplished), wherein the determination of the plurality of secondary events and the occurrence sequence is based on a plurality of event rules; upon approval of the plurality of secondary events and the occurrence sequence for the plurality of secondary events, issue one or more commands to cause the execution of the plurality of secondary events; monitor a completion status of the plurality of secondary events based on information obtained from the plurality of servers associated with the plurality of fund sources; and/or generate an interactive map providing a visual representation of a funding path, the funding path comprising the plurality of secondary events, the occurrence sequence for the plurality of secondary events, and a completion status of the plurality of secondary events.

In some embodiments, in order to execute the directed and secondary events according to the approved occurrence sequence, the system may issue a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

In some embodiments, approval of the plurality of secondary events and the occurrence sequence for the plurality of secondary events is an electronic approval provided by a user via an online portal providing a representation of anticipated payments corresponding to the plurality of secondary events, and an anticipated occurrence sequence for the anticipated payments corresponding to the plurality of secondary events.

In some embodiments, the representation provided to the user is the interactive map providing a visual representation of a funding path, further wherein the user approves the plurality of secondary events and the occurrence sequence for the plurality of secondary events by approving the interactive map (or the package of wires presented) within the online portal.

In some embodiments, the non-transitory machine readable medium further stores computer program instructions which, when executed by the processor, cause the system to: determine if an event discrepancy exists, an event discrepancy existing if any one or more of the plurality of secondary events underlying the directed event did not occur in accordance with one or more of: a predefined relationship between a directed event entity and one or more of the entities controlling one or more of the fund sources, a predefined relationship between two or more of the entities controlling one or more of the fund sources, an agreed upon timing of an event, an agreed upon amount of funding for the event; and send, responsive to a determination that an event discrepancy exists, an electronic notification to a fund source contact requesting resolution of the event discrepancy.

In some embodiments, if the event discrepancy is not resolved within a predefined time period, an event rule may effectuate an event modification. In some embodiments, an event modification includes one or more of: cancelling a request for funds from a fund source, and requesting funds from another fund source.

In some embodiments, the events of the plurality of secondary events comprise one or more of: a wire transfer, an internal funds transfer, and an ACH transfer.

An event rule may define source selection criteria for selecting one or more fund sources among the plurality of fund sources to satisfy the directed event parameters. Source selection criteria may be based upon one or more of: a predefined relationship between a directed event entity and one or more entities controlling one or more of the fund sources, and a predefined relationship between two or more of the entities controlling one or more of the fund sources. Such relationships may call for selection of certain fund sources based on an amount of money, a date of the anticipated transaction, an interest rate, an agreed upon period of exclusivity, or any other criteria relevant to a particular business arrangement between two or more entities. An event rule may further define a sequence selection criteria for determining an occurrence sequence for events of the plurality of secondary events. Similar to the source selection criteria, the sequence selection criteria may be based on one or more of: a predefined relationship between a directed event entity and one or more of the entities controlling one or more of the fund sources, and a predefined relationship between two or more of the entities controlling one or more of the fund sources.

In some embodiments, generating an interactive map includes defining directed event (DE) entity display objects representing an entity that is a party to the directed event. The DE entity display objects may include a visual feature representing directed event (DE) entity attributes, where a DE entity attribute for a given entity may include one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

In some embodiments, generating an interactive map includes defining secondary event (SE) entity display objects representing an entity that is a party to a secondary event (and not the directed event). The SE entity display objects may include a visual feature representing secondary event (SE) entity attributes, where a SE entity attribute for a given entity may include one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

In some embodiments, generating an interactive map includes defining event display objects representing cash movements in the directed event and/or the plurality of secondary events. The event display objects may exhibit a visual feature representing an event attribute. An event attribute for a given event may include one or more of: an event sequence, an event type, a fund source associated with an event, an entity who maintains control over the fund source associated with the event (e.g., an SE entity), a fund destination associated with the event, an entity who maintains control over the fund destination associated with the event (e.g., an SE entity, a DE entity), and an event status.

In some embodiments, generating an interactive map includes defining one or more fund source display objects representing one or more fund source attributes of a fund source of the plurality of fund sources controlled by an entity associated with a secondary event. In some embodiments, the fund source display objects exhibit a visual feature representing a fund source attribute. A fund source attribute for a given fund source may include one or more of: an account name, an account number, an account balance, an account location, a financial institution associated with the account, an insured status of an account, fund source contact information (often an employee of the entity who owns/holds/controls the account), a task completion status associated with an event, a fund release amount, a fund release date, an anticipated fund release date, a fund receipt amount, a fund receipt date, an anticipated fund receipt date.

In some embodiments, the SE entity display objects, fund source display objects, and event display objects may be selectively shown or hidden within the interactive map based upon a user's selection of the DE entity display object associated with the party awaiting funding via one or more secondary events involving one or more fund sources, the entities associated with the fund sources, the events associated with such event display objects and the fund sources associated with such fund source display objects.

According to various embodiments, methods of the present disclosure may include one or more of the following steps: obtaining one or more directed event parameters defining a directed event (in some embodiments, one or more directed event parameters are obtained from user input); determining a plurality of secondary events and an occurrence sequence for the plurality of secondary events, the occurrence of the plurality of secondary events in the occurrence sequence being sufficient to complete the directed event, wherein the determination of the plurality of secondary events and the occurrence sequence is based on the application of one or more event rules; upon approval of the plurality of secondary events and the occurrence sequence for the plurality of secondary events, issuing one or more commands to cause the execution of the plurality of secondary events; monitoring a completion status of the plurality of secondary events based on information obtained from the plurality of servers associated with the plurality of fund sources; and/or generating an interactive map providing a visual representation of a funding path, the funding path comprising the plurality of secondary events, the occurrence sequence for the plurality of secondary events, and a completion status of the plurality of secondary events.

In some embodiments, in order to execute the directed and secondary events according to the approved occurrence sequence, the system may issue a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

In some implementations of the methods of the present disclosure, the method includes determining if an event discrepancy exists, an event discrepancy existing if any of the plurality of secondary events underlying the directed event did not occur in accordance with one or more of: a predefined relationship between a directed event entity and one or more of the entities controlling one or more of the fund sources, a predefined relationship between two or more of the entities controlling one or more of the fund sources, an agreed upon timing of an event, an agreed upon amount of funding for the event; and sending, responsive to a determination that an event discrepancy exists, an electronic notification to a fund source contact requesting resolution of the event discrepancy.

In some implementations of the methods of the present disclosure, if the event discrepancy is not resolved within a predefined time period, an event rule may effectuate an event modification. In some embodiments, an event modification includes one or more of: cancelling a request for funds from a fund source, and requesting funds from another fund source.

In some implementations of the methods of the present disclosure, the events of the plurality of secondary events comprise one or more of: a wire transfer, an internal funds transfer, and an ACH transfer.

An event rule may define source selection criteria for selecting one or more fund sources among the plurality of fund sources to satisfy the directed event parameters. Source selection criteria may be based upon on one or more of: a predefined relationship between a directed event entity and one or more entities controlling one or more of the fund sources, and a predefined relationship between two or more of the entities controlling one or more of the fund sources. An event rule may further define a sequence selection criteria for determining an occurrence sequence for events of the plurality of secondary events. The sequence selection criteria may be based on one or more of: a predefined relationship between a directed event entity and one or more of the entities controlling one or more of the fund sources, and a predefined relationship between two or more of the entities controlling one or more of the fund sources.

In some embodiments, a user themselves may make a selection of one or more fund sources based on known criteria or other preferences as may be desired. And in still further embodiments, the source selected may be based in part by an automated application of source selection criteria, on the one hand, as well as one or more selections or input provided by a user, on the other hand.

In some implementations of the methods of the present disclosure, generating an interactive map includes defining DE entity display objects representing an entity that is a party to the directed event. The DE entity display objects may include a visual feature representing DE entity attributes, where a DE entity attribute for a given party may include one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

In some implementations of the methods of the present disclosure, generating an interactive map includes defining event display objects representing an event attribute of events of the plurality of secondary events. The event display objects may exhibit a visual feature representing an event attribute. An event attribute for a given event may include one or more of: an event sequence, an event type, a fund source associated with an event, an entity who maintains control over the fund source associated with the event (e.g., an SE entity), a fund destination associated with the event, an entity who maintains control over the fund destination associated with the event (e.g., an SE entity, a DE entity), and an event status.

In some implementations of the methods of the present disclosure, generating an interactive map includes defining fund source display objects representing a fund source attribute of a fund source of the plurality of fund sources. In some embodiments, the fund source display objects exhibit a visual feature representing a fund source attribute. A fund source attribute for a given fund source may include one or more of: an account name, an account number, an account balance, an account location, a financial institution associated with the account, an insured status of an account, a controlling entity name, fund source contact information, a task completion status associated with an event, a fund release amount, a fund release date, an anticipated fund release date, a fund receipt amount, a fund receipt date, an anticipated fund receipt date.

In some implementations of the methods of the present disclosure, the SE entity display objects, fund source display objects and event display objects may be selectively shown or hidden within the interactive map based upon a user's selection of the DE entity display object associated with the party awaiting funding via one or more secondary events involving one or more fund sources, the events associated with such event display objects and the fund sources associated with such fund source display objects.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward systems and methods for providing an interactive map of an event driven funding path for affecting a directed event. More particularly, various embodiments of the technology disclosed herein relate to systems and methods for generating such an interactive map and enabling a user to obtain a holistic view of all the secondary events preceding the completion of a directed event, and issuing sequential commands to cause automatic execution of the same in accordance with a desired occurrence sequence.

Figure 1:
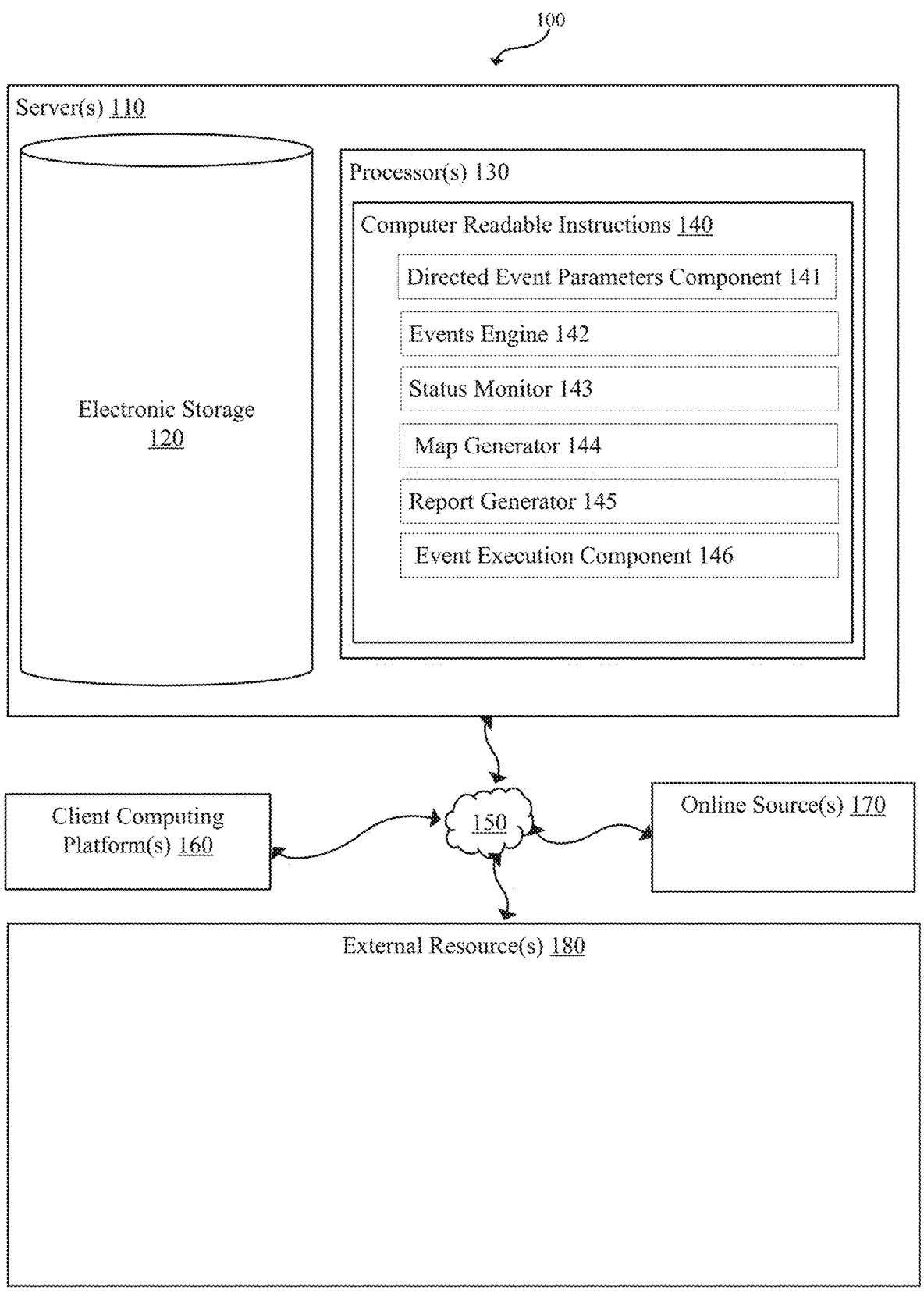
FIG. 1 illustrates an example system in accordance with one or more embodiments of the technology described herein.

FIG. 1 illustrates an example system 100 in accordance with one or more embodiments of the technology described herein. As shown, system 100 may include one or more client computing platforms 160 communicatively coupled over network 150 with servers 110, online sources 170, and external resources 180. Servers 110 may include electronic storage 120, hardware processors 130 coupled with a non-transitory computer readable medium having computer readable instructions 140 stored thereon which, when executed by processors 130, effectuate functionality in accordance with one or more embodiments of the technology described herein. As shown, system 100 may include a directed event parameters component 141, and events engine 142, a status monitor 143, a map generator 144, a report generator 145, an event execution component 146, among other components. In some embodiments system 100 may include communications circuitry operatively coupled with any one or more of the elements of system 100 (e.g., servers 110 client computing platforms 160, online sources 170, external resources 180, etc.) to facilitate wired or wireless communication among the elements of system 100 over network 150. Communication circuitry may include any type of communication circuitry, including any one or more of the technologies disclosed with respect to communications interface 724 of FIG. 7 (discussed in more detail below). Client computing platforms 160 may include desktop, laptop and notebook computers; hand-held computing devices (PDAs, smart phones, cell phones, palmtops, etc.); mainframes, supercomputers, workstations or servers. Online sources may include any database or server including information accessible over the Internet. Electronic storage may include any type of memory configured to store data in an electronic format.

Referring to computer readable instructions 140, directed event parameters component 141 is configured to obtain parameters of a directed event, and events engine 142 is configured to determine the set of secondary events that need to occur (which may include the amounts and event types of each specific secondary event), and the order in which they should occur, for the directed event to be completed (e.g., for the directed event parameters to be satisfied and underlying money movements to occur).

Directed events can involve arrangements of instruments, entities, accounts and funding paths that form an expected transaction or series of transactions. A directed event itself may be completed upon the occurrence of a directed event, and the occurrence of the directed event may be contingent upon the occurrence of one or more underlying secondary events. Instruments, entities, and accounts are commonly understood terms in the art, but funding paths are not. For purposes of this present disclosure a funding path is an ordered arrangement of events, determined according to one or more event rules, both directed events and secondary events, that must occur for a given directed event to be completed. The funding path may be presented in any manner, including as a specially ordered listing showing the lineup of anticipated wires (e.g., a wire batch) for approval and/or execution; or as shown in FIGS. 2A-3B, as an interactive map depicting underlying events (e.g., money movement from one entity to another) and the underlying actions that occur (e.g., electronic wires from one account to another) pursuant to those events including as shown herein, and often the event type associated with the event (explained below).

Events refer to actions or operations that effectuate money movements between two or more entities, accounts, or sources that can lead to the completion of a directed event. For example, an event may comprise one or more of: a wire transfer, an internal funds transfer, and an ACH transfer from one account to another. Directed events refer to the actions or operations that effectuate money movements between the parties to a directed event. Secondary events refer to the actions or operations that effectuate money movements between an entity, account, or source that is not party to the directed event, and an entity, account, or source that may or may not be party to the directed event (which may provide or receive funding—directly or indirectly—to or from one or more parties involved in the directed event). The action or operation that is carried out when an event occurs may be associated with an event type. The event type refers to the nature of the action, for example, "buy," "sell," "draw," for example; and may in some instances refer to the instrument that underlies the action, such as a debt instrument, an equity instrument, or otherwise.

The parameters of the directed event obtained by directed event parameters component 141 (e.g., obtained in whole or in part via user input) may include one or more of an event type (e.g., draw) describing the directed event, an amount of money to be moved (e.g., wired) to complete the directed event (e.g., to complete the wire request draw), a source from which the money is to be wired, and a destination to which the money is to be wired.

As noted, events engine 142 determines the set of secondary events that need to occur (which may include determining the amounts, event types, and/or fund sources), and the order in which they need to occur for the directed event to be completed. In accordance with one or more embodiments of the present disclosure, events engine 142 makes determinations based on one or more event rules. Event rules may define source selection criteria for selecting one or more fund sources among a plurality of available fund sources to satisfy the directed event parameters. In some embodiments, source selection criteria comprises a set of priority designations or conditions which may be satisfied on the basis of a predefined relationship between a directed event entity and one or more entities controlling one or more of the fund sources, and a predefined relationship between two or more of the entities controlling one or more of the fund sources, a business objective of one of the entities, a policy of one of the entities, and the like. As noted, such predefined relationships may call for selection of certain fund sources based on an amount of money, a date of the anticipated transaction, an interest rate, an agreed upon period of exclusivity, or any other criteria relevant to a particular business arrangement between two or more entities.

In some embodiments event rules may further define a sequence selection criteria for determining an occurrence sequence for events of the plurality of secondary events. In some embodiments, sequence selection criteria comprises a set of priority designations or conditions which may be satisfied on the basis of a predefined relationship between a directed event entity and one or more entities controlling one or more of the fund sources, and a predefined relationship between two or more of the entities controlling one or more of the fund sources, a business objective of one of the entities, a policy of one of the entities, and the like. Based on the source selection criteria and sequence selection criteria, events engine 142 may determine who should be involved in carrying out the secondary event, what actions or operations are required to carry out the event, when the actions or operations required to carry out the secondary event should occur (e.g., by what date/time one or more actions or operations should occur), and the like (sometimes referred to herein as event parameters).

In some embodiments, event rules themselves may be preset as a default in system 100 based on a specific type of directed event an entity is always involved in. In other embodiments, event rules (for a particular directed transaction or set of directed transactions) may be defined by a finance professional and submitted for approval by an approver prior to being implemented. Once approved, the event rules may be applied strictly by computer execution without the possibility of intervention by a human without proper approval permissions. Embodiments of the system thus provide an extra layer of security that protects directed events, and secondary events underlying those directed events, from fraudulent activity that could otherwise ensue.

In some embodiments, once events engine 142 has determined the set of secondary events and/or the sequence of secondary events, events engine 142 may provide a description or visual representation of the set of events to an approval component for automated approval (or a dashboard for user approval). Such a description or visual representation of the set of secondary events (e.g., the package of wires, or wire batch), as well as the business logic upon which basis the events may be executed, may be referred to herein as a funding path. Events engine 142 is configured to create the funding path for a given directed event based on automated application of the preset and preapproved event rules, source selection criteria, and/or sequence selection criteria. Moreover, as discussed herein, system 100 is configured to issue commands to effectuate the execution of the secondary events underlying the directed event, and ultimately the directed event.

Further based on the source selection criteria and/or the sequence selection criteria, events engine 142 may determine one or more backup events, and their associated parameters, which may operate as an alternative (automatically or at the instigation of a user) to one or more of the original events should one or more of the original events be the subject of an event discrepancy.

In some embodiments, an events execution component 146 may automatically trigger execution of a recommended package of events—that is, the recommended events that should occur, and/or the order in which they should occur.

In some embodiments, an events execution component 146 may generate and/or present a representation of a recommended package of events (e.g., a wire batch)—that is, the recommended events that should occur, and/or the order in which they should occur—for approval by one or more users (e.g., a supervising finance officer, a chief financial officer, etc., each of whom may require specific information, expertise and/or authority) prior to execution. The representation may be a textual description, a graphical representation such as an interactive map showing an expected funding path (as described in more detail herein), or a combination of both. Upon receiving an indication of approval of the recommended plurality of secondary events and the occurrence sequence for the plurality of secondary events, events execution component 146 may issue command(s) to cause the execution of the plurality of secondary events. For example, upon approval, events execution component 146 may automatically cause or otherwise trigger a series of wire transfers (e.g., bank wires) corresponding to the plurality of secondary events to be executed.

In some instances, approval of the plurality of secondary events and the occurrence sequence for the plurality of secondary events is an electronic approval provided by a user via an online portal providing a representation of anticipated bank wires corresponding to the plurality of secondary events, and an anticipated occurrence sequence for the anticipated bank wires corresponding to the plurality of secondary events. In some instances, the representation provided to the user is the interactive map providing a visual representation of a funding path, further wherein the user approves the plurality of secondary events and the occurrence sequence for the plurality of secondary events by approving the interactive map within the online portal.

The one or more commands issued to cause the execution of the plurality of secondary events comprises a plurality of commands transmitted to trigger the execution of a plurality of bank wires from the plurality of fund sources, the bank wires from the fund sources corresponding to the secondary events. In some embodiments, in order to execute the secondary events according to an approved occurrence sequence, the system may issue a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

Events execution component 146 may, in connection with the issued command(s), present recipient entities (e.g., banks, fund sources, third parties that manage or oversee fund sources, other entities involved in one or more steps of the process, etc.) with one or more recognizable authentication credentials (e.g., an encrypted ID, password, token, or combination thereof, a notice, or a formal written request) identifying the system from which the wire request is being generated. The funding source may then take steps to process the wire with the understanding that the request was made by the system and not by a human.

In some embodiments, an events execution component 146 may generate and/or present a representation of a recommended package of events (e.g., a wire batch)—that is, the recommended events that should occur, and/or the order in which they should occur—for approval by a software component configured to apply predefined approval rules (e.g., perform a series of checks) to determine whether or not to approve the package of events. Upon receiving an indication of approval of the recommended plurality of secondary events and the occurrence sequence for the plurality of secondary events, events execution component 146 may issue command(s) to cause the execution of the plurality of secondary events. For example, upon approval, events execution component 146 may automatically cause a series of wire transfers (e.g., bank wires) corresponding to the plurality of secondary events to be executed.

That is, in some instances, approval of the plurality of secondary events and the occurrence sequence for the plurality of secondary events is an automated electronic approval provided by a software component. In some embodiments, events execution component 146 may apply the approval rules itself (in place of the software component noted). In the case of an ambiguity, or circumstance the software component (or the events execution component 146) is not configured to handle, events execution component 146 may revert to generating and/or presenting a representation of a recommended package of events to a human user as a second attempt at approval.

In some embodiments several attempts at approval may be made depending on event rules and approval rules being applied by system 100. In some embodiments, if no approval is obtained, the determined events are not executed and a notification is sent to a preselected user or group of users (e.g., sent via email, SMS message, notification/alert within an online portal, or other electronic message).

Status monitor 143 monitors the progress and/or completion status of the events relevant to a particular directed event. To do this, status monitor 143 may be operatively coupled with external resources 180 storing status information about the particular event as it pertains to the particular directed event. In some embodiments status monitor 143 may be communicatively coupled to a plurality of servers associated with a plurality of fund sources relevant to actions or operations underlying the secondary events necessary to complete a given directed event. For instance, an example external resource 180 may be a bank server storing up-to-date information about bank accounts.

Status monitor 143 may monitor the progress and/or completion status of the events relevant to a particular directed event by obtaining information from the external resource 180. Such information may include account name, an account number, a routing number, an account balance, an account location, an account type, a financial institution associated with the account, an insured status of an account, a controlling entity name, fund source contact information, a task completion status associated with an event, a fund release amount, a fund release date, an anticipated fund release date, a fund receipt amount, a fund receipt date, an anticipated fund receipt date, balance, bank wire confirmations, bank wire releases, transfer amounts, permissions, etc. relevant to one or more of the entities, accounts, or sources associated with a directed event or secondary event underlying a directed event. It should be understood that status monitor 143 may in some embodiments be configured to request status information from one or more external resources 180 (e.g., bank servers) on continuously, on a periodic basis, at a user's request, or upon the satisfaction of a predefined criteria. Further still, in some embodiments status monitor 143 may be configured to passively receive status information from one or more external resources 180 continuously, on a periodic basis, upon the satisfaction of a predefined criteria as determined by the external resource 180.

In accordance with some embodiments, one or more of event engine 142 and status monitor 143 may determine if an event discrepancy exists among the events that are relevant to a given directed event. An event discrepancy may exist if any one or more of the events—whether the directed events or one of the secondary events—underlying the given directed event did not actually occur as expected. The expectation of the occurrence of an event may be based upon a predefined relationship between a directed event entity and one or more of the entities controlling one or more of the fund sources, a predefined relationship between two or more of the entities controlling one or more of the fund sources, a previously agreed upon timing of an event, a market-based expectation of the timing of an event, a previously agreed upon amount of funding for the event, and the like. In making a determination as to whether or not an event discrepancy exists among the events that are relevant to a given directed event, one or more of the event engine 142 and status monitor 143 may execute machine readable computer program code that compares one or more conditions or understandings that underlie the foregoing relationships and/or agreements with the current (or most recent) progress status or completion status of the one or more of the secondary events underlying the particular directed event to identify a discrepancy.

In accordance with some embodiments system 100 may send (e.g., transmit), responsive to a determination that an event discrepancy exists, an electronic notification to a fund source contact or party entity contact requesting resolution of the event discrepancy. In some instances, a predefined relationship or previous agreement between entities may provide that if an event discrepancy is not resolved within a predefined period of time upon receiving notice of the discrepancy, for example, a different fund source may be selected (e.g., via events engine 142 applying an events rule) as a substitute for the original fund source such that the objective of the original event may be satisfied by the new fund source (i.e., the different fund source) such that the event discrepancy can be resolved and the directed event may progress. Consequently, in some embodiments if the event discrepancy is not resolved within a predefined time period, an event rule may be applied by system 100 in order to effectuate an event modification. The event modification may be any modification allowed within the constraints of the relationship or agreement between the relevant entities. In some embodiments an event modification may include cancelling a request for funds from a first fund source, and requesting funds from a second fund source.

Map generator 144 generates an interactive map that can provide a holistic view of the expected events that would need to take place for a directed event to be completed. In some embodiments, the holistic view of the expected events also includes a required or desired (using a priority rule) sequence of occurrence of the expected events. The holistic view of the expected events arranged to convey the required or desired sequence of occurrence of such expected events may be referred to as a funding path. The interactive map generated by map generator 144 may provide a visual representation of a funding path that illustrates money movements that are expected to take place in order to complete the directed event (i.e., to satisfy one or more of the directed event parameters). In accordance with one or more embodiments of the present disclosure, the interactive map generated by map generator 144 may include display objects having visual features corresponding to a completion status of the plurality of secondary events.

In accordance with some embodiments, generating an interactive map may involve defining DE entity display objects representing an entity that is a party to the directed event (e.g., an entity involved in the directed event). Such DE entity display objects may exhibit a visual feature representing one or more DE entity attributes where DE entity attributes may include one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

Referring still to map generator 144, generating an interactive map may include defining event display objects representing an event attribute of events of the plurality of secondary events, the event display objects having a visual feature representing event attributes, wherein the event attribute for a given event comprises one or more of: an event sequence, an event type, a fund source associated with an event, an entity who maintains control over the fund source associated with the event (e.g., an SE entity), a fund destination associated with the event, an entity who maintains control over the fund destination associated with the event (e.g., an SE entity, a DE entity), and an event status.

In some embodiments, generating an interactive map may include defining fund source display objects representing a source attribute of fund sources of the plurality of fund sources, the source display objects having a visual feature representing source attributes, where the source attribute for a given fund source may include one or more of an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

For purposes of the present disclosure, a visual feature may include a visually perceptible display element that may be viewed on an electronic display (e.g., a monitor, a touchscreen, a set box top, etc.). By way of nonlimiting example, a visual feature may include one or more of hue, saturation, luminance, transparency, size, shape, pattern, visual texture, shadow, dimensionality, relative location within a display zone (e.g., within a window), and the like. A visual feature may in some instances include a time-based change of one or more of the foregoing triggering a visual sensation that draws attention of a user. For example a display object may blink between a first color and a second color while the color of one or more other elements being displayed with said display object remain constant. In such an example, the blinking visual feature may draw the user's attention to the data object exhibiting the blinking effect. The foregoing is not intended to be limiting, and it should be understood by one of ordinary skill in the art that any visual features may be associated with any one or more data objects to convey information about the event (or source, entity, account, etc. related to the event) associated with the display object.

In accordance with one or more embodiments, SE entity display objects and fund source display objects may be selectively shown or hidden within the interactive map based upon a user's selection of an associated DE entity display object (e.g., a DE entity display object associated with a party to the directed event that is awaiting funding from fund sources associated with such fund source display objects). That is to say, map generator 144 may create an interactive map that allows a user to drill down into a portion of the funding path of interest to obtain additional information—e.g., obtain additional information about the entity, fund source, account, etc. associated with the event associated with the portion of the funding path the user selected.

In some embodiments, the interactive map provides an option for an authorized user to approve a presented funding path, and thereby trigger execution of the underlying secondary events (e.g., cause the issuance of a series of commands that operates to cause the execution of one or more bank wires associated with the secondary events).

Figure 2A:
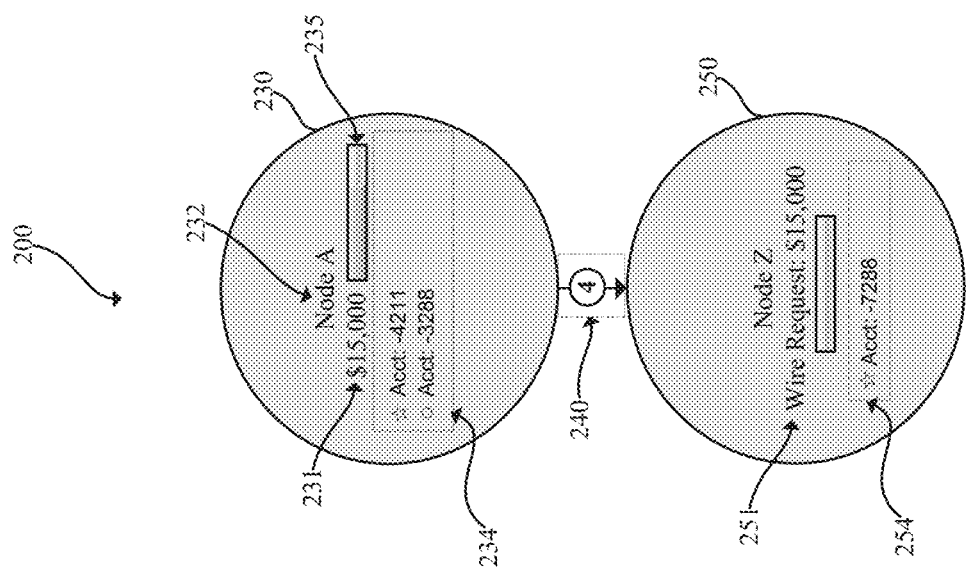
FIG. 2A depicts an example interactive map generated by a system, depicting a portion of a funding path in accordance with one or more embodiments of the present disclosure.

FIG. 2A depicts an example interactive map 200 generated by a system 100, here showing a graphic that may provide visual representation of a funding path in accordance with one or more embodiments of the present disclosure. Here, as may be observed in FIG. 2A, the directed event is a $15,000 loan from Node A to Node Z, effectuated by the execution of a bank wire of $15,000 from Node A to Node Z, the $15,000 corresponding to a debt instrument. Before the bank wire of $15,000 from Node A to Node Z may be completed, Node A may need to collect the $15,000 from one or more other entities (secondary entities) controlling one or more fund sources. As noted above, events engine 142 of system 100 may determine the secondary events that need to occur, and the order in which they need to occur, for the $15,000 bank wire to Node Z to be completed (that is, to complete the directed event). Before discussing example secondary events (shown in FIG. 2B), it is appropriate here to note characteristics of the example display objects shown in FIG. 2A, including various example visual features.

As shown, interactive map 200 may include one or more DE entity display objects (e.g., DE entity display object 230 and DE entity display object 250) representing the entities (e.g., referred to as Nodes for purposes of FIGS. 2A-2C) involved in the directed event (often the last event in a series of events leading to the completion of the objective transaction, including the actions or operations that effectuate money movements between the parties to the directed event) as well as other event attributes associated with the directed event (e.g., the expected wire amount, here identified by numerals 231 and 251).

As shown, a DE entity display object may include one or more visual features representing DE entity attributes and/or other event attributes. For example, both DE entity display object 230 and DE entity display object 250 are each defined by a circle having a solid black outline and a yellow fill. These visual features may be associated with an event attribute. For example, both circles are the same size, here indicating that the amount expected to be transferred and the total amount expected to be received upon transfer are the same (i.e., equal). That is, the size of the circles that provide a portion of the DE entity display objects may be keyed to an amount of money coming in, being transferred out, received in total, or expected to be received in total, or the like. Also note that both DE entity display objects 230, 250 comprise a yellow fill. As noted above, color is a visual feature that may be used to convey one or more pieces of information about a directed event, an entity/party associated with the directed event, or similar information about secondary events underlying the directed event, among other things. One of ordinary skill in the art will appreciate upon reading this disclosure that any color (or other visual/textual feature) may be designated to convey any attribute. For purposes of this example, and for explanatory purposes, assume that the color yellow refers to a pending status of an associated event, the color red refers to a error status of an associated event (e.g., on account of an event discrepancy), and green refers to a completed status of an associated event. As may be seen, the directed event involving both Node A and Node Z is shown as being in a pending status.

As further shown in FIG. 2A, DE entity display object 230 includes text providing a Node identifier 232 (here, Node A), an expected wire amount 231 associated with corresponding instrument underlying the deal (e.g., a debt instrument). DE entity display object 230 may also include a graphic such as a progress bar 235. Progress bar 235 may visually convey progress information resulting from the completion or non-completion of one or more secondary events underlying a portion of the wire amounts that are expected to be received by Node A before being transferred to Node Z (represented by DE entity display object 250). As may be observed, approximately 66% of the $15,000 associated with debt instruments have been received by Node A pursuant to one or more underlying secondary events. As may be observed from DE entity display object 250 Node Z has received 0% of the $15,000 bank wire is expected to be received from Node A. Though not shown in FIG. 2A, it should be noted that additional or different progress bars or other dynamic graphics or indicators may be included as part of one or more of the display objects, for example, to show an aggregate progress or weighted progress relevant to the completion of the directed event, provide an alert or notification (e.g., use of a red flag icon).

Interactive map 200 may include one or more other event display objects representing an event attribute of the directed event (shown in FIG. 2A) and/or the secondary events underlying the directed event (shown in FIG. 2B), such event display objects having a visual feature representing event attributes such as an event sequence, an event type, a fund source associated with an event, an entity who maintains control over the fund source associated with the event (e.g., an SE entity), a fund destination associated with the event, an entity who maintains control over the fund destination associated with the event (e.g., an SE entity, a DE entity), an event status, and the like. Here, the event display object 240 includes an arrow pointed from Node A to Node Z, as well as the number four within a circle overlaying the arrow. The direction of the arrow may refer to the direction of the expected flow of funds (i.e., movement of money), and the number four may refer to the event's placement in the overall sequence of events (including secondary events and the directed event). That is, in this example, the bank wire of $15,000 from Node A to Node Z (the directed event (corresponding to event display object 240 in interactive map 200)) will be the fourth event (or, in the fourth batch of events) in the overall sequence of events necessary to complete the directed event.

As noted previously, the display objects of the interactive maps of the present disclosure allow a user to drill down into a portion of the representation of the funding path of interest to obtain additional information about the wire package—e.g., obtain additional information about the entities, fund sources, accounts, etc. associated with the directed or secondary events associated with the portion of the funding path the user selects. For example, if a user were to select DE entity display object 230, the interactive map 200 may expand to depict the one or more secondary events underlying that segment of the funding path, the occurrence of such secondary events resulting in Node A receiving the $15,000 associated with debt instrument that may thereafter be transferred to Node Z. Such a depiction is shown in FIG. 2B.

Figure 2B:
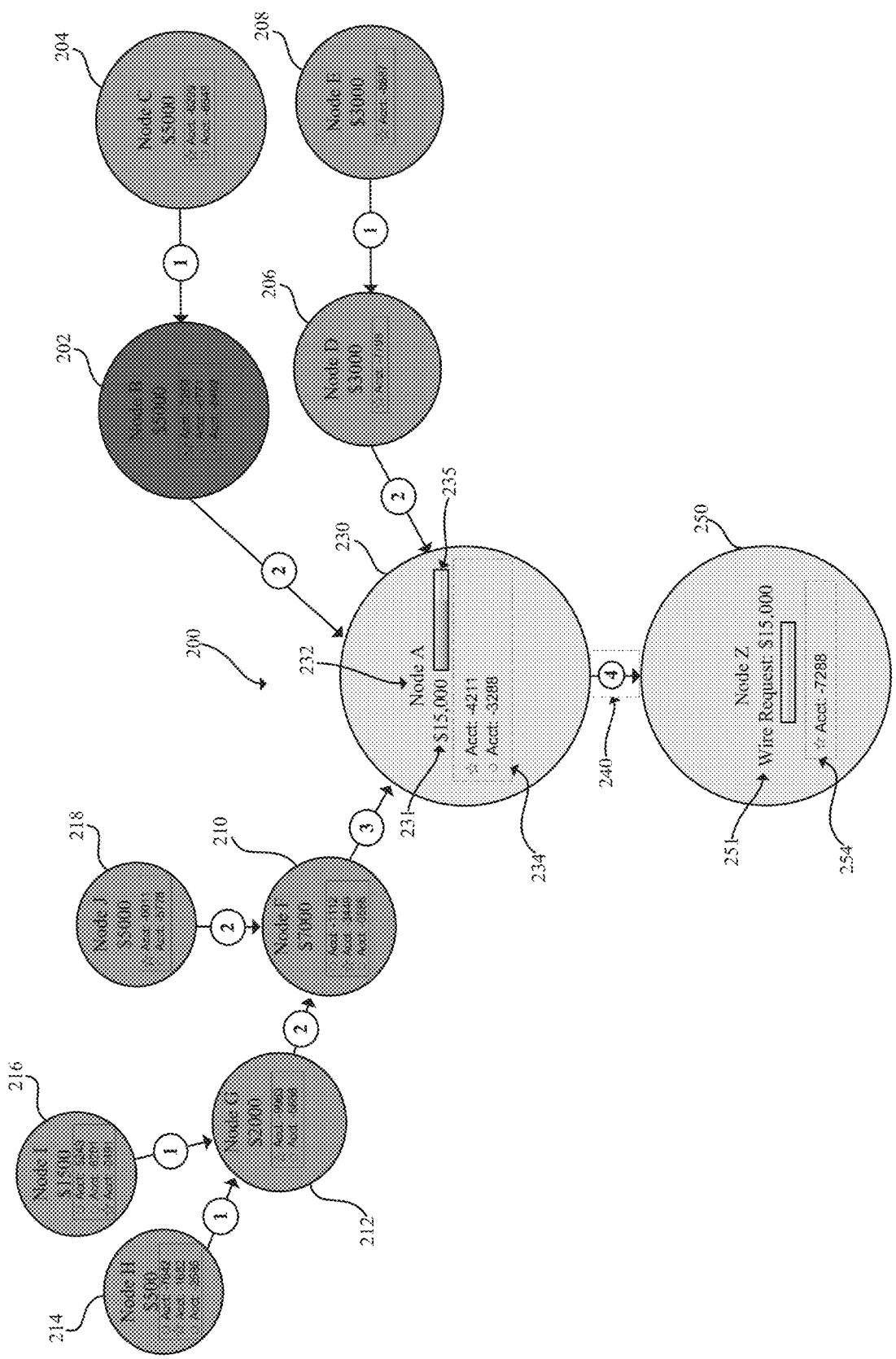
FIG. 2B depicts the example interactive map of FIG. 2A upon selection of a DE entity display object, in accordance with one or more embodiments of the present disclosure.

FIG. 2B depicts the interactive map 200 of FIG. 2A upon selection of DE entity display object 230, for example. As shown, SE entity display objects 202, 204, 206, 208, 210, 212, 214, 216, and 218 are associated with entities identified as Node B, Node C, Node D, Node E, Node F, Node G, Node H, Node I and Node J respectively—each of which are expected to provide a portion of the $15,000 for the directed event (corresponding to event display object 240 in interactive map 200), the portions from fund sources (e.g. accounts) controlled by the entities represented by the SE entity display objects 202-218. As may be seen, the size of the SE entity display objects 202-218 is again keyed to the amount of the bank wire expected as part of the associated event. This feature is not required for all implementations of the disclosed technology, but in some applications can be a desired feature.

As shown, $500 is expected to be wired from Node H to Node G and $1500 is expected to be wired from Node I to Node G, for a total of $2000 at Node G, which is further expected to be wired to Node F. A total of $5000 is also expected to be wired from Node J to Node F, and Node F is then expected to wire the collected $7000 to Node A. As further shown, $5000 is also expected to be transferred from Node C to Node B, which is further expected to be transferred from Node B to Node A. And $3000 is expected to be transferred from Node E to Node D, which is further expected to be transferred from Node D to Node A. Assuming each of the foregoing bank wires occurs as expected (i.e., each of the secondary events is effectuated) Node A will hold $15,000 associated with debt instruments which may then be wired to Node Z (i.e., wired to an account owned/controlled by Node Z) to complete the directed event (corresponding to event display object 240 in the interactive map 200).

As shown in FIG. 2B, event display objects are provided to illustrate cash movements, payments, transfers or other flow related to an event. Here, by way of example, event display objects are shown as arrows pointing in the direction of the money movements, each having a number within a circle overlaying the arrow, the number indicating an expected sequence of events. In some instances, as shown here, more than one event may have the same number denoting its sequence, meaning that multiple events may occur in sub-batches in a given sequence. For example as shown, there are four secondary events that can occur as part of a first sub-batch (those denoted by number 1 within a circle overlaying respective arrows), there are two secondary events that can occur as part of a second sub-batch (those denoted by number 2 within a circle overlaying respective arrows), and there is one secondary event that can occur as part of a third sub-batch (denoted by number 3 within the circle overlaying the arrow between Node F and Node A). The directed event may be considered a sub-batch in and of itself, and is often the last event (denoted by number 4 within the circle overlaying the arrow between Node A and Node Z) in the wire package/batch. As one may appreciate upon reading the instant disclosure, precursor events must occur before later events that rely on such precursor events are completed. System 100 may execute commands in accordance with such requirements. For instance, Node F cannot wire $7000 to Node A unless and until it receives the $2000 wire from Node G and the $5000 wire from Node J. Similarly, Node G cannot wire the $2000 to Node F unless and until Node G receives the $500 from Node H and $1500 from Node I respectively. System 100 may order and/or time issuance of commands causing the execution of a later event based on a completion status of a precursor event.

As may be observed from FIG. 2B, SE entity display objects 204, 206, 208, 210, 212, 214, and 216 exhibit a green fill, indicating that the secondary event they are participating in (e.g., bank wires of their respective amounts to respective accounts receiving Nodes) are complete, but SE entity display object 202 associated with Node B exhibits a red fill, indicating that the event it is participating in (e.g., the wire of $5,000 to Node A) is in an error status suggesting the related events have not been processed by said Node (indicating, in some instances, that an event discrepancy exists). On account of the rich information conveyed by the holistic interactive map 200, a user overseeing the funding path representation associated with a directed event may quickly identify which secondary events are holding up the completion of the directed event. System 100 may be configured, via one or more of event engine 142 and/or status monitor 143, to send, responsive to a determination that an event discrepancy exists, an electronic notification to a fund source contact associated with an event discrepancy (here, to the fund source contact associated with one or more of the fund sources (e.g., accounts) associated with Node B) to request resolution of the event discrepancy, or to take some other action.

Figure 2C:
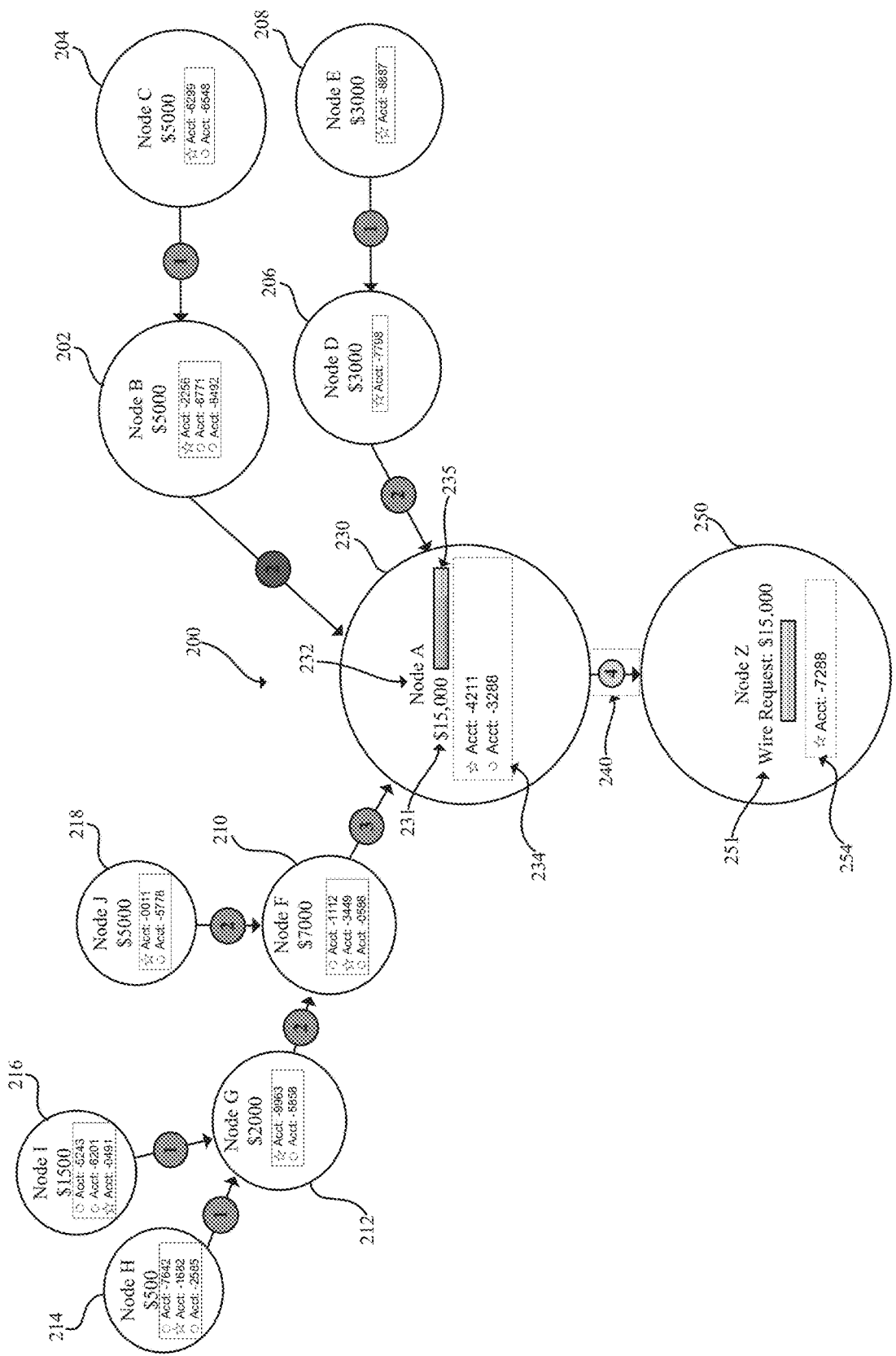
FIG. 2C depicts another example of an interactive map, illustrating a variation of the interactive map shown in FIG. 2B, in accordance with one or more embodiments of the present disclosure.

It should be recognized that in some embodiments, event display objects may include one or more visual features in addition or alternative to the visual features discussed herein with respect to SE entity display objects and/or DE entity display objects. For example, in some implementations it may be desirable to provide a visual feature (color) to the event display object instead of the SE entity display object to more specifically convey the status of the individual event. FIG. 2C shows such an example including a modified version of the interactive map shown in FIG. 2B, with the same numerals used to designate the same elements. FIG. 2C utilizes event display objects (the circles around the occurrence numerals) to display the visual feature (here, color) conveying the status of completion of the respective events. In still further embodiments, both event display objects, SE entity display objects, and DE entity display objects may display one or more visual features to convey the same or similar information (e.g., where both the SE entity display objects and the event display objects display a green, yellow, or red fill indicating event status, for example).

As noted above, in some embodiments, generating an interactive map includes defining fund source display objects representing a fund source attribute of a fund source of the plurality of fund sources controlled by an entity associated with a directed event or a secondary event. In some embodiments, the fund source display objects exhibit a visual feature representing a fund source attribute. A fund source attribute for a given fund source may include one or more of: an account name, an account number, an account balance, an account location, a financial institution associated with the account, an insured status of an account, fund source contact information (often an employee of the entity who owns/holds/controls the account), a task completion status associated with an event, a fund release amount, a fund release date, an anticipated fund release date, a fund receipt amount, a fund receipt date, an anticipated fund receipt date.

An example of fund source display objects are shown in FIGS. 2A and 2B in field 234 of DE entity display object 230. As shown, fund source account names are given (here, shown as a partial account number) that are associated with the entity represented by the Node. For instance, Node A has/owns/controls two accounts—one account ending in 4211 ("Acct:-4211") and one account ending in 3288 ("Acct:-3288")—one of which will be the source of the payment to Node Z in the directed transaction. A visual feature may be provided to indicate which of a plurality of accounts will be involved in the particular event. For instance, a symbol such as a star (as shown in FIG. 2B) may be provided next to the accounts involved in the event, and a circle may be provided next to the accounts not involved in the event. Thus, in some embodiments, not only may the entity associated with the fund source be viewed, but also the individual accounts that are owned/controlled by those entities may be viewed in terms of their involvement in a given event or set of events.

Thus, taking the example provided in FIG. 2B and looking at the starred accounts, a viewer may be able to quickly tell that the $500 wire from Node H to Node G is expected to come from Node H's account ending in 1682 ("Acct:-1682) and be deposited into Node G's account ending in 9963 ("Acct:-9963); the $1500 wire from Node I to Node G is expected to come from Node I's account ending in 0491 ("Acct:-0491) and be deposited into Node G's account ending in 9963 ("Acct:-9963?), then the $2000 wire from Node G to Node F is expected to come from Node G's account ending in 9963 ("Acct:-9963) and be deposited into Node F's account ending in 3449 ("Acct:-3449), the $5000 wire from Node J to Node F is expected to come from Node J's account ending in 0011 ("Acct:-0011") and be deposited into Node F's account ending in 3449 ("Acct:-3449), and so on and so forth through the entire funding path. Thus, a user may quickly recognize upon viewing the map where the problem lies in moving things forward on the directed event—that is, there is a problem with Node B (colored red to indicate an error)'s account ending in 2256 ("Acct:-2256") that needs to be resolved before Node A will be in receipt of the full $15,000 to wire to Node Z. System 100 may recognize this as an event discrepancy and send automatic requests, notifications, and/or automatically determine/select an alternative funding source to provide the $5,000 that for one reason or another Node B has not/cannot process.

Though fund source display objects may not be used in some embodiments of the present disclosure, they often prove very useful as demonstrated by the example above. Further, it should be recognized that this is just a single example of a single type of fund source display object (here, the account name), and that any other information about the fund source, the entity controlling the fund source, or the event the fund source is expected to be involved within, may be presented in the interactive map as a fund source display object.

Though not shown in FIG. 2B, it should be appreciated that any and all of the visual features discussed in the present disclosure may be incorporated into any one or more of the fund source display objects, event display objects, and SE entity display objects, and DE entity display objects. For example SE entity display objects 202-210 may include a progress bar similar to the progress bar 235 of DE entity display object 230. Further, one of ordinary skill in the art will appreciate that there is some overlap in what can be represented as a fund source display object and an SE entity display object, and/or other display objects discussed herein. For instance, an account name or symbol displayed in an interactive map may be considered a fund source display object, an SE entity display object, a fund source display object encompassed within an SE entity display object, or all three of these. The display object terminology used herein is merely provided for aid in description of the figures presented. Different terminology may be used without exceeding the spirit of the present disclosure.

Figure 2D:
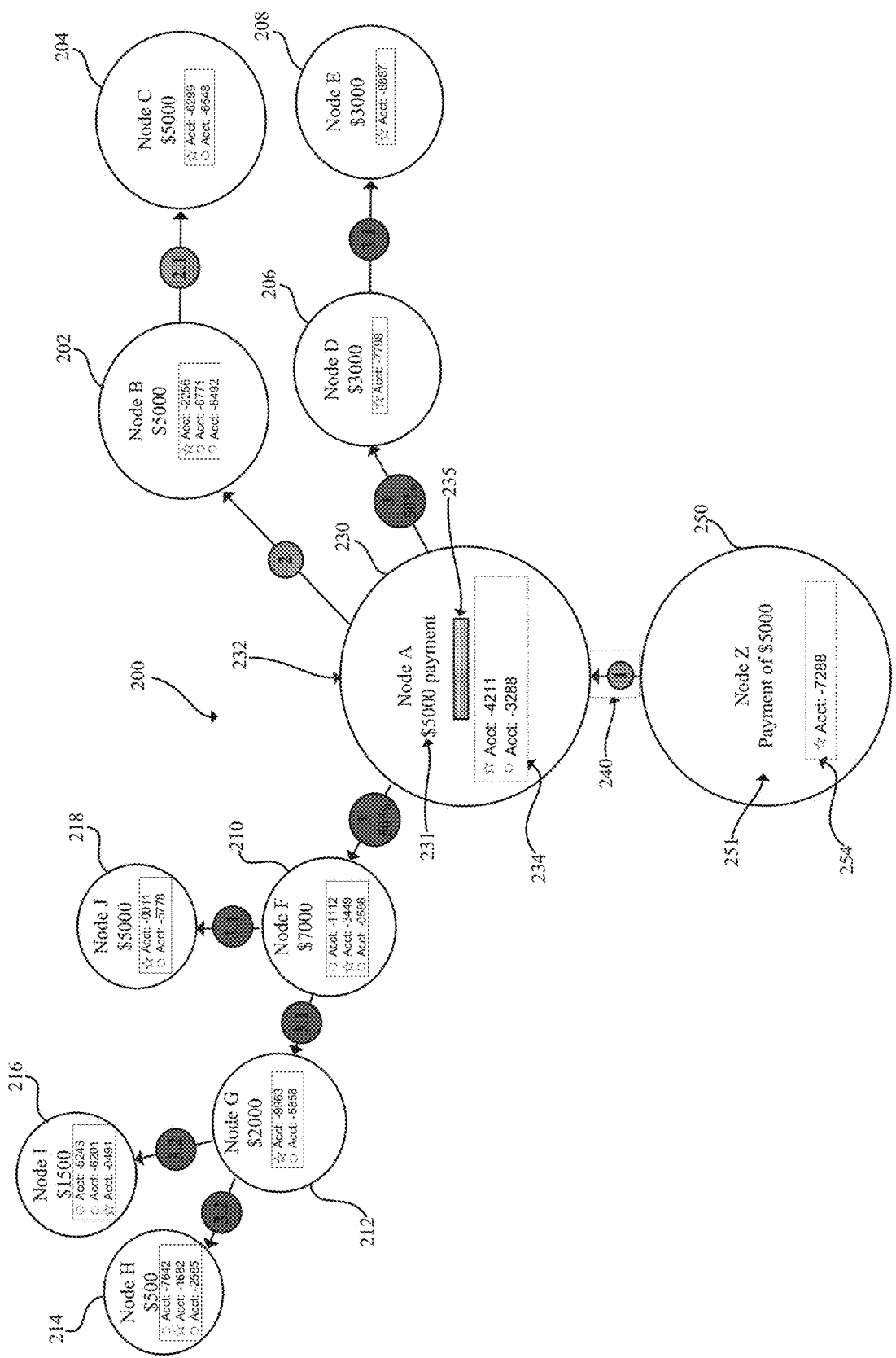
FIG. 2D depicts another example interactive map, here representing an example repayment distribution back through a funding path, in accordance with one or more embodiments of the present disclosure.

One of ordinary skill in the art will appreciate upon review of the instant disclosure, that the interactive maps of the disclosed technology may also be provided in the reverse direction of the original directed event. For example, FIG. 2D depicts a different directed event that involves a repayment of a portion of the $15,000 debt incurred by Node Z pursuant to the directed event depicted between Node A and Node Z in FIGS. 2A and 2B. The same numbering has been applied in FIG. 2D to maintain the same players that were involved in the directed event for which example funding paths were shown in FIGS. 2A-2C. As shown in FIG. 2D, the directed event in this instance may involve a payment of $5000 on the $15,000 debt obligation that Node Z has to Node A. The same components discussed in FIG. 1 (e.g., directed event parameters component 141, events engine 142, status monitor 143, map generator 144, report generator 145, and event execution component 146) may operate to determine a plurality of secondary events and an occurrence sequence for the plurality of secondary events that should occur based on the directed event (here, the payment of $5000 from Node Z to Node A). But here, instead of events engine 142 determining a plurality of secondary events that must occur before the directed event may occur, events engine 142 determines how to handle the directed event that has occurred (an incoming payment from Node Z) based on Node A's relationships with one or more of Nodes B-J. For example, if Node A has arranged for a payment priority as between Node B, Node D and Node F such that the first $5000 that Node Z pays back to Node A will be distributed to Node B, then subsequent payments made thereafter will be split evenly between Node D and Node F until node F is paid off, then subsequent payments made thereafter will be paid 100% to Node D, the interactive map provided by the present technology may look like that shown in FIG. 2D.

As shown, the directed event in this instance may be the event symbolized by the number one encircled and overlaid over the arrow between Node Z and Node A. In the given example, Node Z is making a $5000 payment on the $15,000 debt obligation. On account of the arrangement Node A has with Node B, Node D and Node F, the entire $5000 will go directly to Node B. Thus, as shown, DE entity display object 250 and 230 appear yellow because repayment has not been made in full, and SE entity display object 202 appears green because repayment to Node B has been made in full; and SE entity display objects 204-216 appear red because no repayment has been made to the associated Nodes. Event display objects may include an indication of the repayment arrangement (e.g., the third batch of repayment wires show 50% in the circle, indicating that after the payments in sub-batch two are complete, any sub-batch three payments will be split 50-50 between Node F and Node D. One of ordinary skill in the art will appreciate the many variations on the foregoing example may be implemented without departing from the scope and spirit of the instant disclosure. For instance, a pattern fill or other visual feature may be used instead of color in the display objects, for example, to convey the information that is desired to be conveyed for a particular application.

Figure 2E:
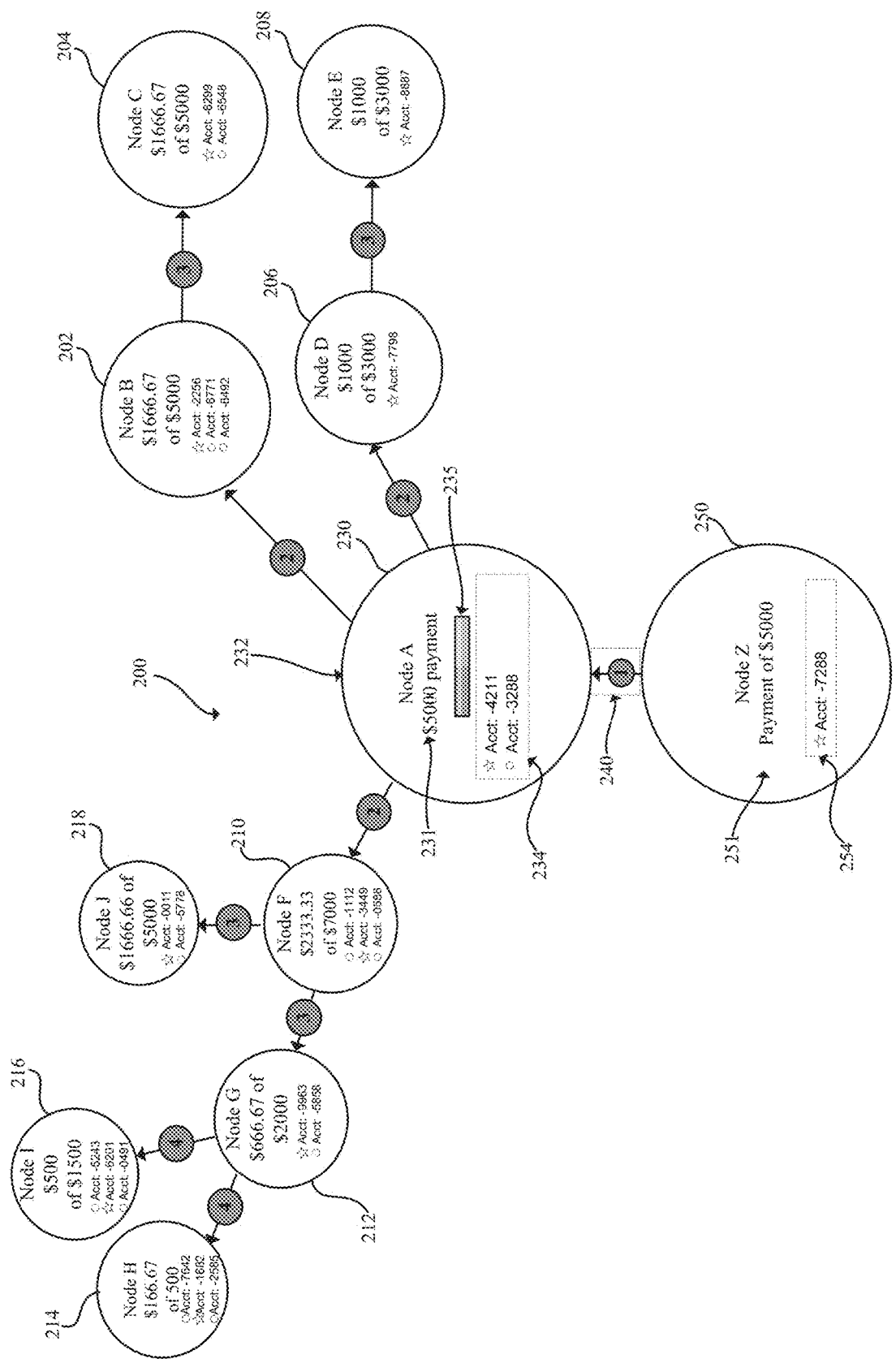
FIG. 2E depicts another example interactive map, here representing another example repayment distribution back through a funding path, in accordance with one or more embodiments of the present disclosure.

Notwithstanding the foregoing example, one of ordinary skill in the art will appreciate that the business relationships and/or payment priorities may be predefined in any manner acceptable for the arrangement. In some embodiments, the incoming payment may simply be distributed throughout the funding path for the original directed event (the original directed event being the debt incurred as shown in FIG. 2B) in pro-rata proportions based on weighted contribution. Such an example is shown in FIG. 2E depicting a pro-rata redistribution of money back through the funding path in FIGS. 2B and 2C (assuming, simply for sake of example, that the discrepancy with the payment from Node B to Node A is resolved). For instance, as shown in FIG. 2E, because Node B sourced $5000 (or 33.3%) of the $15000, Node D sourced $3000 (or 20%) of the $15000, and Node F sourced $7000 (or 46.6%) of the $15000, when the $5000 payment comes in to Node A from Node Z, system 100 may automatically recognize the payment determine the pro-rata portions that should be paid out to Nodes B, D, and F. System 100 may then automatically issue one or more commands to execute such payments. For example, system 100 may determine such amounts and issue commands that cause 33.$\overline{3}$% of the $5,000 (or $1666.67) to be wired to Node B, 20.0% of the $5,000 (or $1000) to be wired to Node D; and 46.6% of the $5,000 (or $2333.33) to be wired to Node F.

Similarly, system 100 (or subsystems similar to system 100 at SE entities) may perform similar operations at deeper layers of secondary events. Taking the above example, for instance, because Node C sourced $5000 (or 100%) of the $5000 sent from Node B to Node A, upon Node B receiving the $1666.67 from Node A system 100 may process a payment of the entire $1666.67 to Node C. Similarly, because Node E sourced $3000 (or 100%) of the $3000 sent from Node D to Node A, upon Node D receiving the $1000 from Node A system 100 may process a payment of the entire $1000 to Node E. Similarly, because Node J sourced $5000 (or 71.4286%) of the $7000 sent from Node F to Node A, upon Node F receiving the $2333.33 from Node A system 100 may process a payment of 71.4286% of the $2333.33 (or $1666.66) to Node J. And because Node G sourced $2000 (or 28.5714%) of the $7000 sent from Node F to Node A, upon Node F receiving the $2333.33 from Node A system 100 may process a payment of 28.5714% of the $2333.33 (or $666.67) to Node G.

Again, system 100 (or subsystems similar to system 100 at SE entities) may perform similar operations any N-depth layer of secondary events. To complete the example above, because Node I sourced $1500 (or 75.0%) of the $2000 sent from Node G to Node F, upon Node G receiving the $666.67 from Node F system 100 may process a payment of 75.0% of the $666.67 (or $500) to Node I. And because Node H sourced $500 (or 25.0%) of the $2000 sent from Node G to Node F, upon Node G receiving the $666.67 from Node F system 100 may process a payment of 25.0% of the $666.67 (or $166.67) to Node H.

Figure 3A:
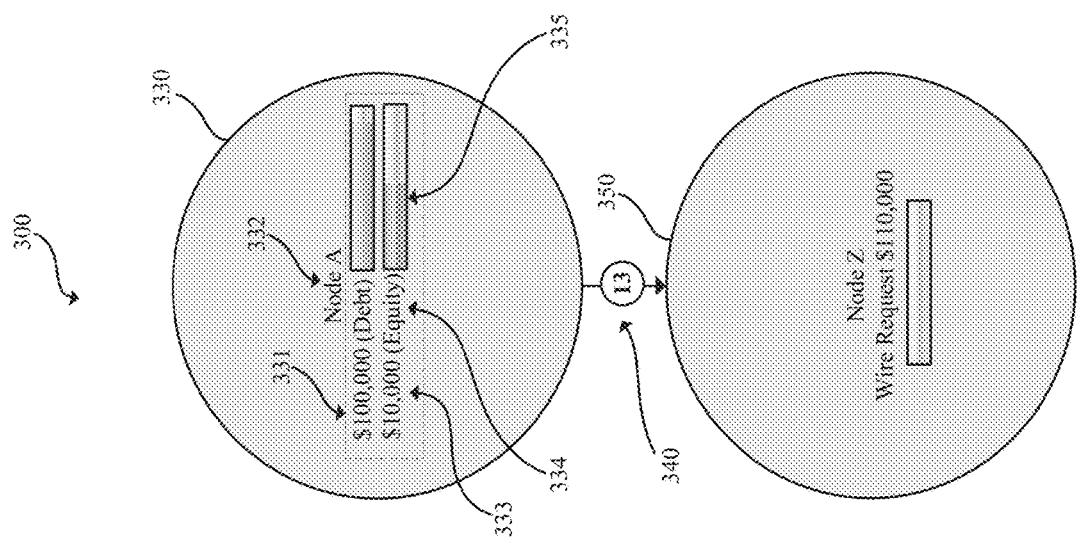
FIG. 3A depicts an example interactive map generated by a system, depicting a portion of a funding path in accordance with one or more embodiments of the present disclosure.

FIG. 3A depicts an example interactive map 200 generated by a system 100, depicting graphics that may represent a funding path in accordance with one or more embodiments of the present disclosure. Here, as may be observed in FIG. 3A, the directed event is effectuated by the execution of a bank wire of $110,000 from Node A to Node Z, $100,000 corresponding to a debt instrument, with $10,000 corresponding to equity. The example directed event shown in FIG. 3A may be effectuated upon a bank wire from Node A to Node Z in the amount of $110,000; this action is the directed event. But before this bank wire (i.e., the directed event in this example) may be completed, Node A may need to gather the $10,000 equity portion and $100,000 debt portion from one or more other entities controlling one or more other fund sources. As noted above, events engine 142 of system 100 may determine the secondary events that need to occur, and the order in which they need to occur, for the $110,000 bank wire to Node Z to be completed (i.e., for the directed event to be accomplished). Before discussing example secondary events (shown in FIG. 3B), it is appropriate here to note characteristics of the example display objects shown in FIG. 3A, including various example visual features.

As shown, interactive map 300 may include one or more DE entity display objects (e.g., DE entity display object 330 and DE entity display object 350) representing the entities, sources, and/or accounts (e.g., collectively referred to for purposes of FIGS. 3A-3C as Nodes) involved in the directed event (the directed event being the event corresponding to the directed event itself—often the last event in a series of events leading to the completion of the directed event including the actions or operations that effectuate money movements between the parties to the directed event).

As shown, a DE entity display object may include one or more visual features representing DE entity attributes and/or event attributes. For example, both DE entity display object 330 and DE entity display object 350 are each defined by a circle having a solid black outline and a yellow fill. These features may be associated with an attribute. For example, both circles are the same size, here indicating that the amount expected to be transferred and the total amount expected to be received upon transfer are the same (i.e., equal). That is, the size of the circles that provide a portion of the DE entity display objects may be keyed to an amount of money coming in, being transferred out, received in total, or expected to be received in total, or the like. Also note that both DE entity display objects 330, 350 comprise a yellow fill. As noted above, color is a visual feature that may be used to convey one or more pieces of information about a directed event, a party associated with the directed event, or secondary events underlying the directed event among other things. One of ordinary skill in the art will appreciate upon reading this disclosure that any color may be designated to convey any attribute. For purposes of this example, and for explanatory purposes, assume that the color yellow refers to a pending status of an associated event, the color red refers to a error status of an associated event (e.g., on account of an event discrepancy), and green refers to a completed status of an associated event. As may be seen, the directed event involving both Node A and Node Z is shown as being in a pending status.

As further shown in FIG. 3A, DE entity display object 330 includes a field 331 including text providing a Node identifier 332, an expected wire amounts 333 associated with corresponding instrument types 334 (shown in parentheses). Field 331 of DE entity display object 330 may also include a graphic such as a progress bar 335. Progress bar 335 may visually convey progress information resulting from the completion or noncompletion of one or more secondary events underlying a portion of the wire amounts that are expected to be received by Node A before being transferred to Node Z (represented by DE entity display object 350). As may be observed, approximately 90% of the $100,000 associated with debt have been received by Node A pursuant to one or more underlying secondary events, and approximately 50% of the $10,000 associated with equity has been received by Node A to one or more underlying secondary events. As may be observed from DE entity display object 350 Node Z has received 0% of the $110,000 bank wire is expected to receive from Node A. Though not shown in FIG. 3A, it should be noted that additional or different progress bars or other dynamic graphics or indicators may be included as part of one or more of the display objects, for example, to show an aggregate progress or weighted progress relevant to the completion of the directed event, provide an alert or notification (e.g., use of a red flag icon).

Interactive map 300 may include one or more event display objects representing an event attribute of the directed event (shown in FIG. 3A) and/or the secondary events underlying the directed event (shown in FIG. 3B), the event display objects having a visual feature representing event attributes such as an event sequence, an event type, a fund source associated with an event, an entity who maintains control over the fund source associated with the event (e.g., an SE entity), a fund destination associated with the event, an entity who maintains control over the fund destination associated with the event (e.g., an SE entity, a DE entity), and an event status. Here, the event display object 340 includes an arrow pointed from Node A to Node Z, as well as the number thirteen within a circle overlaying the arrow. The direction of the arrow may refer to the direction of the expected flow of funds (i.e., movement of money), and the number thirteen may refer to the events placement in a sequence of events. That is, in this example, the bank wire of $110,000 from Node A to Nodes Z will be the thirteenth event in the sequence of events necessary to complete the directed event.

As noted previously, the display objects of the interactive maps of the present disclosure allow a user to drill down into a portion of the funding path of interest to obtain additional information—e.g., obtain additional information about the entity, fund source, account, etc. associated with the event(s) associated with the portion of the funding path the user selected. For example, if a user were to select DE entity display object 330, the interactive map 300 may expand to depict the one or more events underlying that segment of the funding path, the occurrence of which will result in Node A receiving the $100,000 associated with debt and the $10,000 associated with equity that may thereafter be transferred to Node Z. Such a depiction is shown in FIG. 3B.

Figure 3B:
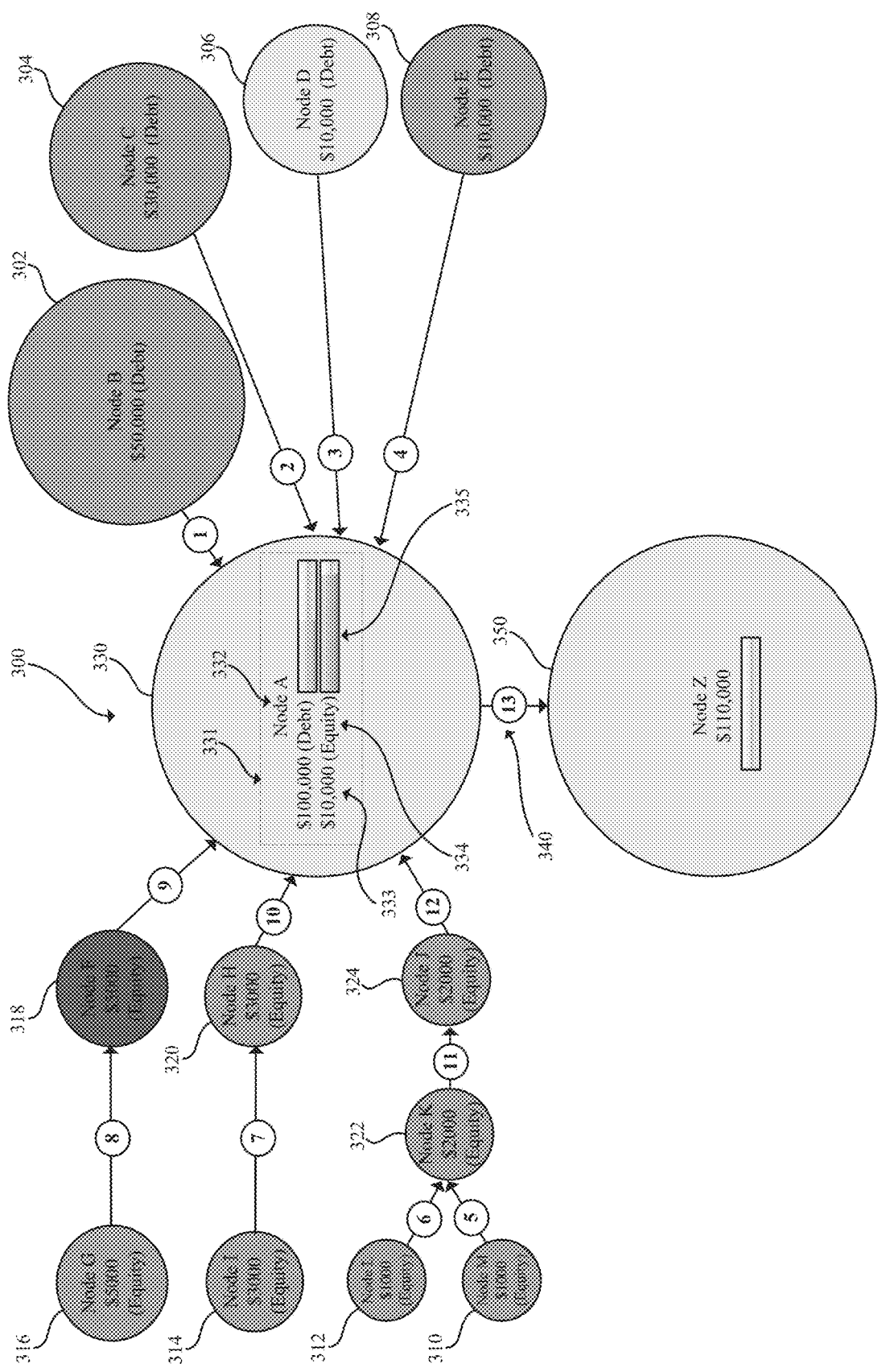
FIG. 3B depicts the example interactive map of FIG. 3A upon selection of a DE entity display object, in accordance with one or more embodiments of the present disclosure.

FIG. 3B depicts the example interactive map 300 of FIG. 3A upon selection of DE entity display object 330. As shown, SE entity display objects 302, 304, 306, and 308 are associated with entities identified as Node B, Node C, Node D, and Node E respectively—each of which are expected to provide a portion of the $100,000 debt element of the directed event from fund sources controlled by the entities represented by the SE entity display objects. As may be seen, the size of the SE entity display objects 302-308 is again keyed to the amount of the bank wire expected as part of the associated event. As shown, $50,000 is expected to be transferred from Node B to Node A, $30,000 is expected to be transferred from Node C to Node A, $10,000 is expected to be transferred from Node D to Node A, and $10,000 is expected to be transferred from Node E to Node A, for a total of $100,000. As may be observed from FIG. 3B, SE entity display objects 302, 304, and 308 exhibit a green fill, indicating that the event they are participating in (e.g., bank wires of their respective amounts to an account controlled by Node A) are complete, but SE entity display object 306 exhibits a yellow fill, indicating that the event the associated SE entity it is participating in (e.g., the wire of $10,000 to an account controlled by Node A) is still pending and not yet complete.

As further shown in FIG. 3B, SE entity display objects 310, 312, 314, 316, 318, 300, 320, 322 and 324 are associated with entities identified as Node M, Node L, Node I, Node G, Node F, Node H, Node K, and Node J, respectively—each of which are expected to provide a portion of the $10,000 equity element of the directed event from fund sources controlled by the entities represented by the SE entity display objects. As may be seen, the size of the SE entity display objects 310-324 is again keyed to the amount of the bank wire expected as part of the associated event. As shown $1000 is expected to be wired from Node M to Node K and $1000 is expected to be wired from Node L to Node K, for a total of $2000 at Node K which is further expected to be wired to Node J, and which is further expected to be transferred from Node J to Node A. As further shown, $3000 is expected to be transferred from Node I to Node H, which is further expected to be transferred from Node H to Node A. And $6000 is expected to be transferred from Node G to Node F, which is which is further expected to be transferred from Node F to Node A. Assuming each of the foregoing bank wires occurs as expected Node A will hold $110,000–$100,000 of which is associated with debt instruments, and $10,000 of which is associated with equity—which may then be wired to Node Z (i.e., wired to an account owned/controlled by Node Z) to complete the directed event.

As shown in FIG. 3B, event display objects are provided to illustrate cash movements, payments, transfers or other flow related to an event. Here, by way of example, event display objects are shown as arrows pointing in the direction of the money movements, each having a number within a circle overlaying the arrow, the number indicating an expected sequence of events. Although the example provided in FIG. 3B makes it apparent that in some instances a particular sequence is merely desired, but not required—i.e., one or more events may occur out of sequence if other priorities or competing rules take precedence over the sequence, or if one or more events may occur out of sequence without causing a material effect on the directed event. For example as shown, event 1, event 2, event 3, and event 4 may occur simultaneously or out of order without having a material effect on the directed event. In some instances, however, at least a portion of the expected sequence must occur in order. For instance, Node J cannot wire $2000 to Node A unless and until it receives the $2000 wire from Node K. Similarly, Node K cannot wire the $2000 to Node J unless and until it receives $1000 from Node M and $1000 from Node L respectively. As such, events 5 and 6 must necessarily occur before event 11, and event 11 must occur before event 12. And in this example, all secondary events (here, events 1-12) must occur before the directed event (here, event 13).

As may be observed from FIG. 3B, SE entity display objects 310, 312, 314, 316, 320, 322, and 324 exhibit a green fill, indicating that the event they are participating in (e.g., bank wires of their respective amounts to respective receiving Nodes) are complete, but SE entity display object 318 exhibits a red fill, indicating that the event it is participating in (e.g., the wire of $5,000 to Node A) is in in error status suggesting there exists an event discrepancy. On account of the rich information conveyed by the holistic interactive map 300, a user overseeing the funding path associated with a directed event may quickly identify what events our holding up the completion of the directed event. System 100 may be configured, via one or more of event engine 142 and/or status monitor 143, to send, responsive to a determination that an event discrepancy exists, an electronic notification to a fund source contact associated with an event discrepancy (here, to the fund source contact associated with one or more of the fund sources (e.g., accounts) associated with Node F) to request resolution of the event discrepancy, or to take some other action.

Though not shown in FIG. 3B, it should be appreciated that any and all of the visual features discussed in the present disclosure may be incorporated into any one or more of the fund source display objects, event display objects, and SE entity display objects, and DE entity display objects. For example SE entity display objects 302-324 may include a progress bar similar to the progress bar 335 of DE entity display object 330. Further, one of ordinary skill in the art will appreciate that there is some overlap in what can be represented as a fund source display object and an SE entity display object. For instance, an account name or symbol displayed in an interactive map may be considered a fund source display object, an SE entity display object, a fund source display object encompassed within an SE entity display object, or all three of these. The display object terminology used herein is merely provided for aid in description of the figures presented. Different terminology may be used without exceeding the spirit of the present disclosure.

It should further be understood that, although the term secondary events is used to denote the series of events that underlie the directed event, the term should also be understood to refer to additional events underlying the first level of secondary events. That is, secondary events may refer to tertiary events, quaternary events, N-ary events, etc., but for ease and simplicity of description all such events have been referred to in the present disclosure as secondary events. For example, referring to FIG. 3B, while the transfer of $5000 from Node G to Node F may be considered a tertiary event—as it is three event layers deep into the overall transaction, for simplicity both the transfer of $5000 from Node G to Node F and the later transfer of $5000 Node F to Node A may be considered secondary events for purposes of the present disclosure. Nevertheless it should be understood that the instant disclosure contemplates highly complex arrangements of any number of events with any number of layers and interdependencies.

It should further be recognized that although the examples provided herein primarily discuss a single directed event between two entities, the technology disclosed herein may be implemented with respect to any number of additional directed events made within the context of a larger directed event. For example, one entity may provide another entity a revolving credit facility, and the entities may be involved in several "sub-directed events" within the context of the larger directed event. Map generator 144 may be configured to generate an interactive map depicting any one or more of the larger directed event itself, or any one or more of the "sub-directed events." One of ordinary skill in the art will appreciate that all such implementations, variations, or modifications are within the scope of the of the technology disclosed herein.

Figure 4:
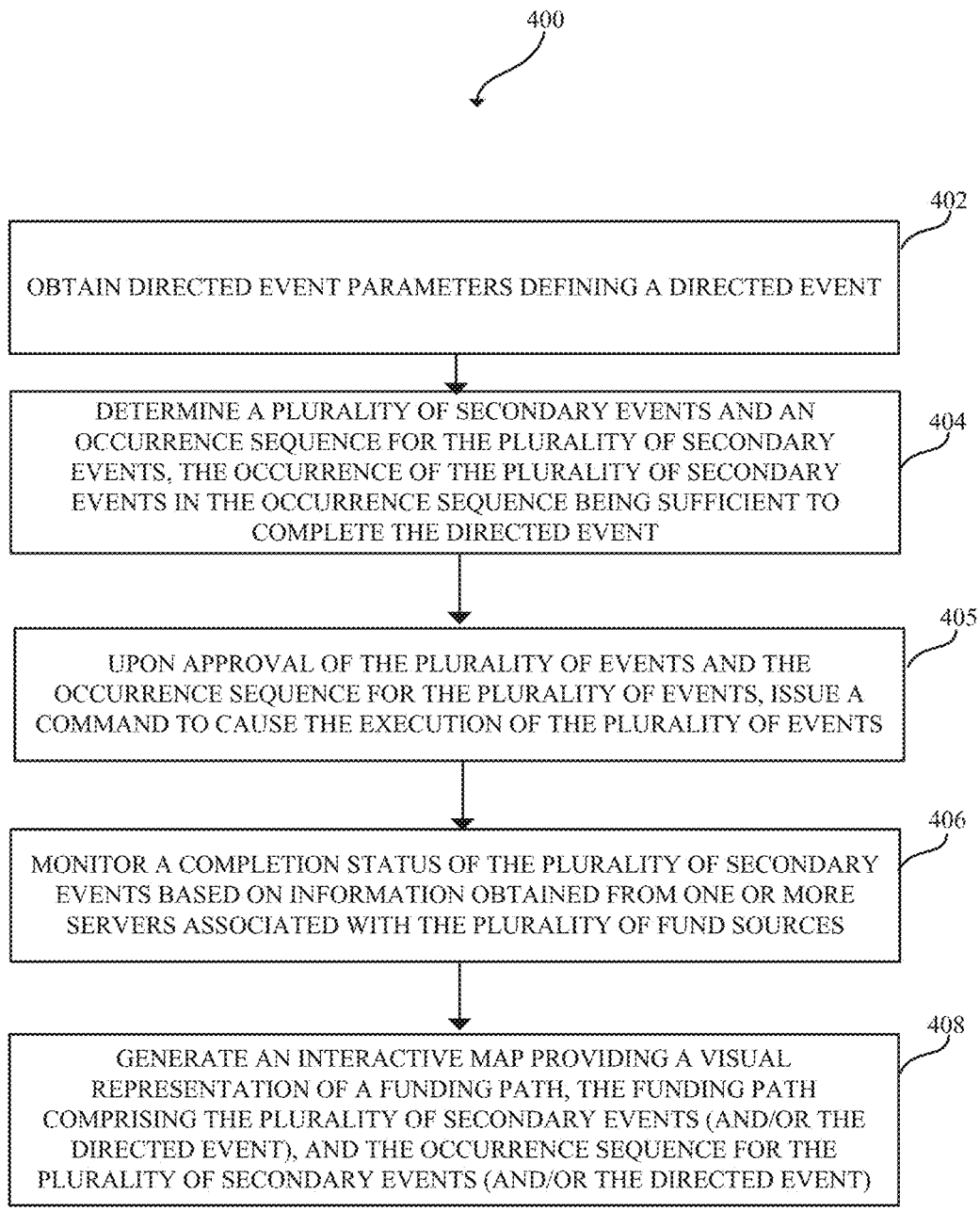
FIG. 4 illustrates an example method in accordance with one or more embodiments of the present disclosure.

FIG. 4 illustrates an example method in accordance with one or more embodiments of the present disclosure. As shown, at operation 402, method 400 obtains directed event parameters defining a directed event. At operation 404, method 400 determines a plurality of secondary events and an occurrence sequence for the plurality of secondary events, the occurrence of the plurality of secondary events in the occurrence sequence being sufficient to complete the directed event. At operation 405, upon approval of the plurality of secondary events and the occurrence sequence for the plurality of secondary events, method 400 issues one or more commands to cause the execution of the plurality of secondary events (which may involve a time-ordered execution of such events), the one or more commands issued subsequent to approval of the plurality of secondary events and the occurrence sequence for the plurality of secondary events. At operation 406, method 400 monitors a completion status of the plurality of secondary events based on information obtained from one or more servers associated with the plurality of fund sources. At operation 408, method 400 generates an interactive map providing a visual representation of a funding path, the funding path comprising the plurality of secondary events, and the occurrence sequence for the plurality of secondary events.

In some embodiments, in order to execute the directed and secondary events according to the approved occurrence sequence, the method 400 may involve issuing a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

Figure 5:
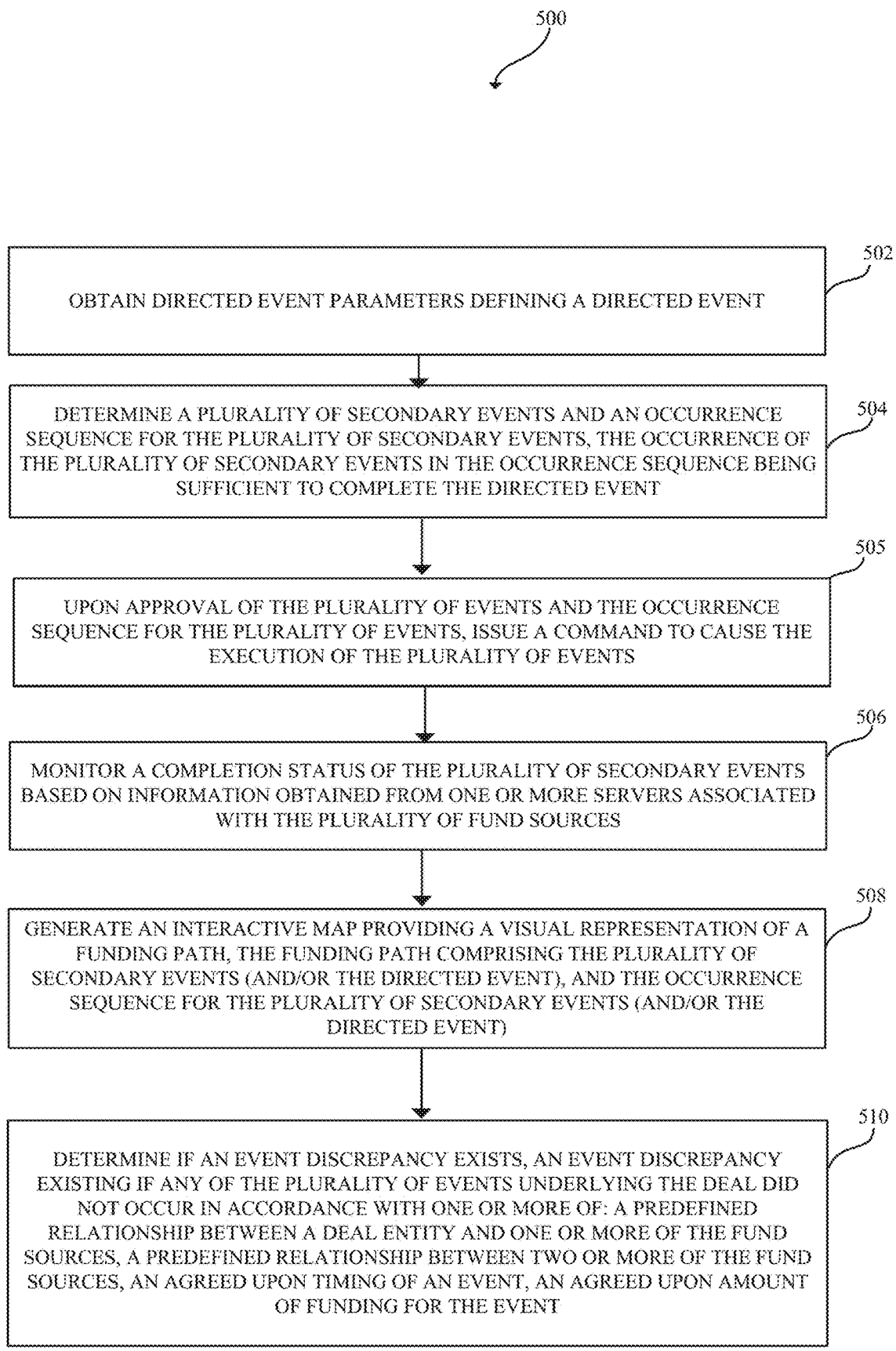
FIG. 5 illustrates an example method in accordance with one or more embodiments of the present disclosure.

FIG. 5 illustrates an example method in accordance with one or more embodiments of the present disclosure. At operation 502, method 500 defines one or more directed event parameters describing a directed event. At operation 504, method 500 determines a plurality of secondary events and an occurrence sequence for the plurality of secondary events, the occurrence of the plurality of secondary events in the occurrence sequence being sufficient to complete the directed event, wherein the determination of the plurality of secondary events and the occurrence sequence is based on a plurality of event rules. At operation 505, method 500 issues one or more commands to cause the execution of the plurality of secondary events, the one or more commands issued subsequent to approval of the plurality of secondary events and the occurrence sequence for the plurality of secondary events. At operation 506, method 500 monitors a completion status of the plurality of secondary events based on information obtained from one or more servers associated with the plurality of fund sources. At operation 508, method 500 generates an interactive map providing a visual representation of a funding path, the funding path comprising the plurality of secondary events, and the occurrence sequence for the plurality of secondary events, and a completion status of the plurality of secondary events. At operation 510, method 500 determines if an event discrepancy exists, an event discrepancy existing if any of the plurality of secondary events underlying the directed event did not occur in accordance with one or more of: a predefined relationship between a directed event entity and one or more of the entities controlling one or more of the fund sources, a predefined relationship between two or more of the entities controlling one or more of the fund sources, an agreed upon timing of an event, an agreed upon amount of funding for the event.

In some embodiments, in order to execute the directed and secondary events according to the approved occurrence sequence, the method 500 may involve issuing a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

Figure 6:
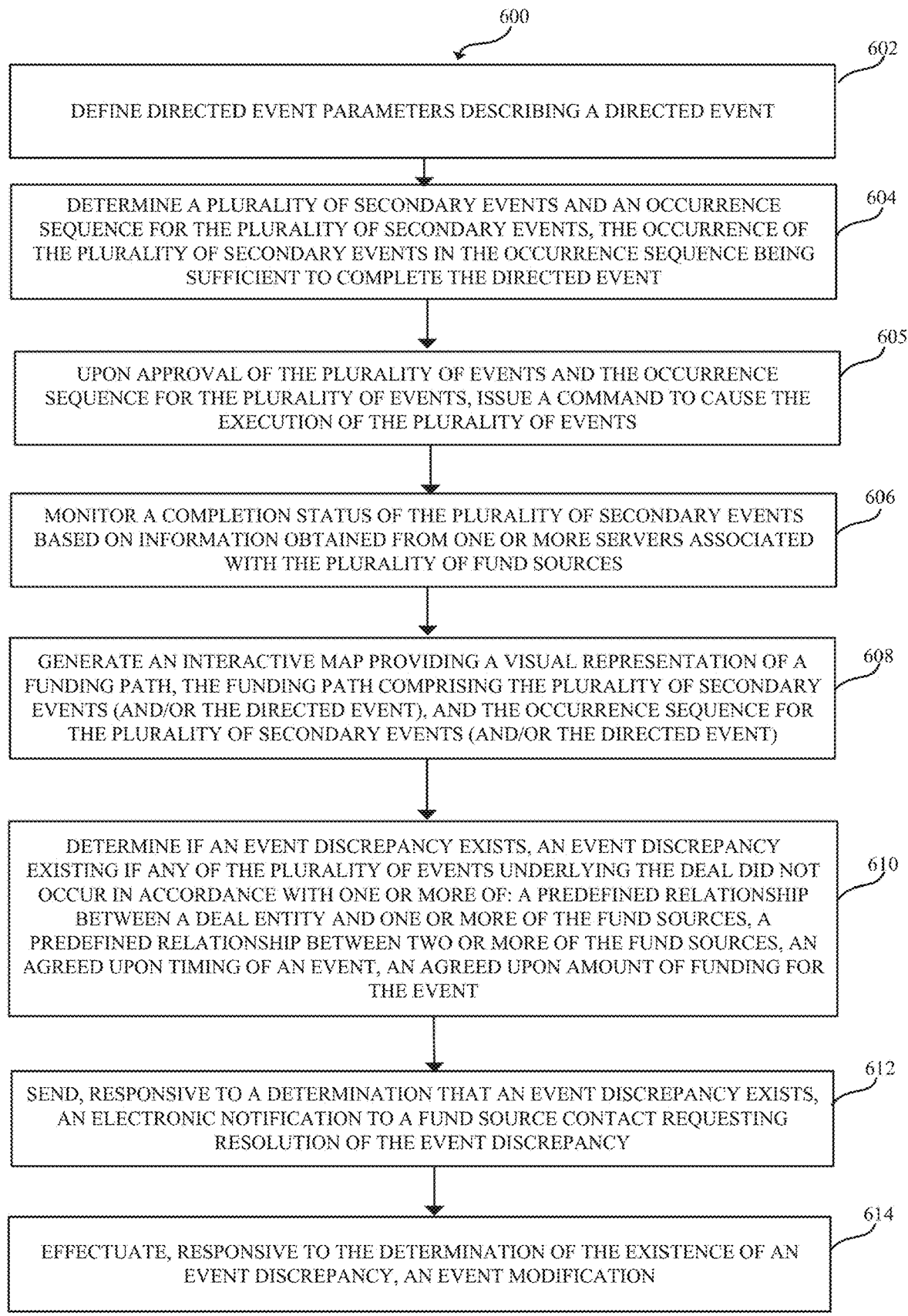
FIG. 6 illustrates an example method in accordance with one or more embodiments of the present disclosure.

FIG. 6 illustrates an example method in accordance with one or more embodiments of the present disclosure. At operation 602, method 600 defines one or more directed event parameters describing a directed event. At operation 604, method 600 determines a plurality of secondary events and an occurrence sequence for the plurality of secondary events, the occurrence of the plurality of secondary events in the occurrence sequence being sufficient to complete the directed event, wherein the determination of the plurality of secondary events and the occurrence sequence is based on a plurality of event rules. At operation 605, method 600 issues one or more commands to cause the execution of the plurality of secondary events, the one or more commands issued subsequent to approval of: the plurality of secondary events and the occurrence sequence for the plurality of secondary events. At operation 606, method 600 monitors a completion status of the plurality of secondary events based on information obtained from one or more servers associated with the plurality of fund sources. At operation 608, method 600 generates an interactive map providing a visual representation of a funding path, the funding path comprising the plurality of secondary events, and the occurrence sequence for the plurality of secondary events, and a completion status of the plurality of secondary events. At operation 610, method 600 determines if an event discrepancy exists, an event discrepancy existing if any of the plurality of secondary events underlying the directed event did not occur in accordance with one or more of: a predefined relationship between a directed event entity and one or more of the entities controlling one or more of the fund sources, a predefined relationship between two or more of the entities controlling one or more of the fund sources, an agreed upon timing of an event, an agreed upon amount of funding for the event. At operation 612, method 600 sends, responsive to a determination that an event discrepancy exists, an electronic notification to a fund source contact requesting resolution of the event discrepancy. At operation 614, method 600 effectuates, responsive to the determination of the existence of an event discrepancy, an event modification.

In some embodiments, in order to execute the directed and secondary events according to the approved occurrence sequence, the method 600 may involve issuing a series of commands in a corresponding sequence to ensure each subsequent event in the series is only executed once the precursor event(s) are complete. That is, the one or more commands issued may comprise a first command to cause the execution of a first secondary event, and a second command to cause the execution of a second secondary event, the second command only issued upon the completion of the first secondary event. In some embodiments the issuance of commands in a sequence corresponding to the approved occurrence sequence is based on the monitored completion status based on information obtained from the plurality of servers associated with the plurality of fund sources.

As used herein, the term sequence may refer to a temporal order of occurrence. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The terms component, engine, monitor, tool and generator can be used to refer to any apparatus configured to perform a recited function. For example, components can include a collection of one or more components, and can also be comprised of hardware, software or a combination thereof. Thus, for example, a component can be a collection of one or more software components, hardware components, software/hardware components or any combination or permutation thereof. As another example, a component can be a computing device or other appliance on which software runs or in which hardware is implemented.

Figure 7:
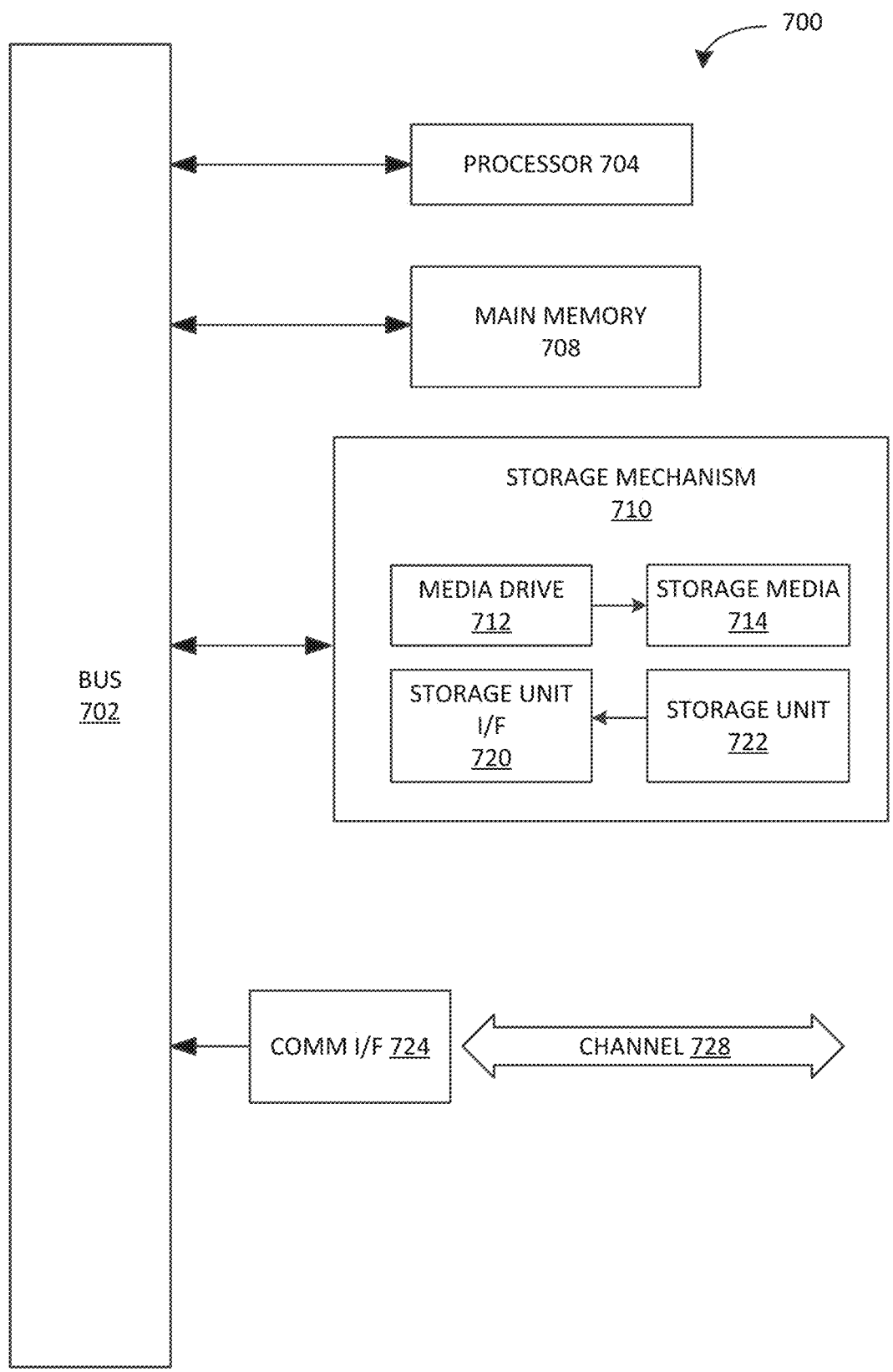
FIG. 7 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing engine capable of carrying out the functionality described with respect thereto. One such example computing component is shown in FIG. 7. Various embodiments are described in terms of this example-computing component 700. After reading this description, it will become apparent to a person skilled in the relevant art how to implement the technology using other computing components or architectures.

Referring now to FIG. 7, computing component 700 may represent, for example, computing or processing capabilities found within desktop, laptop and notebook computers; hand-held computing devices (PDAs, smart phones, cell phones, palmtops, etc.); mainframes, supercomputers, workstations or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine readable medium," "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    a hardware processor;
    a communications circuit communicatively coupled with a plurality of servers associated with a plurality of third-party fund sources;
    a non-transitory machine readable medium storing computer program instructions which, when executed by the processor, cause the system to:
    obtain directed event parameters defining a directed event, wherein the directed event is a wire transfer from a first party to a second party and the directed event parameters comprise a determined amount of funds required to support occurrence of the directed event;
    determine a plurality of secondary events required to provide the determined amount of funds to the first party, and an occurrence sequence for the occurrence of each secondary event in the plurality of secondary events;
        wherein a secondary event of the plurality of secondary events comprises a wire transfer from a direct third-party fund source to the first party, and another secondary event of the plurality of secondary events comprises a wire transfer from an indirect third-party fund source to a direct third-party fund source as part of a multi-step wire transfer from the indirect third-party fund source to the first party;
        wherein the occurrence sequence defines an order of the wire transfers in the multi-step wire transfer;
        wherein the occurrence of the secondary events in the determined occurrence sequence, if executed, provides an amount of funds greater than or equal to an amount of funds required to support occurrence of the directed event;
        and
        wherein the determination of the plurality of secondary events and the occurrence sequence is based on a plurality of event rules identifying which third-party fund sources will fund at least a portion of the directed event;
    receive an indication comprising an approval of both the plurality of secondary events and the occurrence sequence;
    issue, responsive to the indication, a command to cause execution of the wire transfer corresponding to each secondary event of the plurality of secondary events;
    monitor a completion status of each secondary event of the plurality of secondary events based on information obtained from the plurality of servers associated with a plurality of entities controlling one or more of the third-party fund sources; and
    generate an interactive map and display the interactive map to a user, the interactive map comprising a visual representation of a funding path, the funding path comprising the plurality of secondary events, the occurrence sequence of each secondary event of the plurality of secondary events, a direction of fund movements between third-party fund sources corresponding to the secondary events, and a completion status of each secondary event of the plurality of secondary events.

2. The system of claim 1, wherein the approval is an electronic approval provided by a user via an online portal providing a representation of: wire transfers corresponding to each secondary event of the plurality of secondary events, and an occurrence sequence for the wire transfers corresponding to each secondary event of the plurality of secondary events.

3. The system of claim 2, wherein approval of each secondary event of the plurality of secondary events and the occurrence sequence for each secondary event of the plurality of secondary events is effectuated by the user approving the interactive map via the online portal.

4. The system of claim 1, wherein the command comprises a plurality of commands transmitted to one or more entities controlling one or more of the third-party fund sources, or to one or more third-party fund sources directly, to cause sequential execution of a plurality of wire transfers in accordance with the occurrence sequence, the plurality of wire transfers corresponding to the plurality of secondary events.

5. The system of claim 1, wherein the non-transitory machine readable medium further stores computer program instructions which, when executed by the processor, cause the system to:
   detect the existence of an event discrepancy, an event discrepancy existing where any one or more of the secondary events fails to occur in accordance with the one or more commands;
   send, responsive to an event discrepancy detection, an electronic notification to a third-party fund source contact requesting resolution of the event discrepancy.

6. The system of claim 5, wherein the non-transitory machine readable medium further stores computer program instructions which, when executed by the processor, cause the system to:
   determine whether a detected event discrepancy has been resolved within a predefined time period; and,
   generate, after determining that an event discrepancy has not been resolved within a predefined time period, an event modification, wherein an event modification includes one or more of: cancelling a request for funds from a third-party fund source, and requesting funds from another third-party fund source.

7. The system of claim 1, wherein the event rules are based on one or more of: a predefined relationship between a directed event entity and one or more entities controlling one or more of the third-party fund sources, and a predefined relationship between two or more of the entities controlling one or more of the third-party fund sources.

8. The system of claim 1, wherein an event rule further defines a sequence selection criteria for determining an occurrence sequence for events of the plurality of secondary events.

9. The system of claim 8, wherein the sequence selection criteria is based on one or more of: a predefined relationship between a directed event entity and one or more of the entities controlling one or more of the third-party fund sources, and a predefined relationship between two or more of the entities controlling one or more of the third-party fund sources.

10. The system of claim 1, wherein generating an interactive map further comprises defining one or more DE entity display objects representing an entity that is a party to the directed event, the DE entity display objects having a visual feature representing DE entity attributes, wherein the DE entity attribute for a given party comprises one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

11. The system of claim 10, wherein generating an interactive map comprises defining one or more SE entity display objects representing a secondary entity that is a party to a secondary event, and defining SE event display objects representing an event attribute of events of the plurality of secondary events, the SE event display objects having a visual feature representing event attributes, wherein the event attribute for a given event comprises one or more of: an event sequence, an event type, an event fund source, an event fund destination, and an event status.

12. The system of claim 11, wherein generating an interactive map further comprises defining fund source display objects representing a source attribute of third-party fund sources of the plurality of third-party fund sources, the source display objects having a visual feature representing source attributes, wherein the source attribute for a given third-party fund source comprises one or more of: an account name, an account number, an account balance, an account location, a financial institution associated with the account, an insured status of an account, a controlling entity name, fund source contact information, a task completion status associated with an event, a fund release amount, a fund release date, an anticipated fund release date, a fund receipt amount, a fund receipt date, an anticipated fund receipt date.

13. The system of claim 12, wherein the SE entity display objects and fund source display objects may be selectively shown or hidden within the interactive map based upon a user's selection of the DE entity display object associated with the party awaiting funding from third-party fund sources associated with such fund source display objects.

14. A method, comprising:
   obtaining directed event parameters defining a directed event, wherein the directed event is a wire transfer from a first party to a second party and the directed event parameters comprise a determined amount of funds required to support occurrence of the directed event;
   determining a plurality of secondary events required to provide the determined amount of funds to the first party, and an occurrence sequence for the plurality of secondary events, wherein the plurality of secondary events
      wherein a secondary event of the plurality of secondary events comprises a wire transfer from a direct third-party fund source to the first party, and another secondary event of the plurality of secondary events comprises a wire transfer from an indirect third-party fund source to a direct third-party fund source as part of a multi-step wire transfer from the indirect third-party fund source to the first party;
      wherein the occurrence sequence defines an order of the wire transfers in the multi-step wire transfer;
   wherein the occurrence of the secondary events in the determined occurrence sequence, if executed, provides an amount of funds greater than or equal to an amount of funds required to support occurrence of the directed event;
   wherein the determination of the plurality of secondary events and the occurrence sequence is based on a plurality of event rules identifying which third-party fund sources will fund at least a portion of the directed event;
   receiving an indication comprising an approval of both the plurality of secondary events and the occurrence sequence;
   issuing, responsive to the indication, a command to cause execution of the wire transfer corresponding to each secondary event of the plurality of secondary events;
   monitoring a completion status of each secondary event of the plurality of secondary events based on information obtained from one or more servers associated with a plurality of entities controlling one or more of the third-party of fund sources;

generating an interactive map and display the interactive map to a user, the interactive map comprising a visual representation of a funding path, the funding path comprising the plurality of secondary events, the occurrence sequence for the plurality of secondary events, a direction of fund movements between third-party fund sources corresponding to the secondary events, and a completion status of the plurality of secondary events.

15. The method of claim 14, wherein the approval is an electronic approval provided by a user via an online portal providing a representation of: wire transfers corresponding to the plurality of secondary events, and an occurrence sequence for the wire transfers corresponding to the plurality of secondary events.

16. The method of claim 15, wherein approval of each secondary event of the plurality of secondary events and the occurrence sequence for the plurality of secondary events is effectuated by the user approving the interactive map via the online portal.

17. The method of claim 14, wherein the events command comprises a plurality of commands transmitted to one or more entities controlling one or more of the third-party fund sources, or to one or more third-party fund sources directly, to cause sequential execution of a plurality of wire transfers in accordance with the occurrence sequence, the plurality of wire transfers corresponding to the plurality of secondary events.

18. The method of claim 14, further comprising:
detecting the existence of an event discrepancy, an event discrepancy existing where any one or more of the plurality of secondary events fails to occur in accordance with the one or more commands;
sending, responsive to an event discrepancy detection, an electronic notification to a third-party fund source contact requesting resolution of the event discrepancy.

19. The method of claim 18, further comprising:
determining whether a detected event discrepancy has been resolved within a predefined time period; and
generating, after determining that an event discrepancy has not been resolved within a predefined time period, an event modification, wherein an event modification includes one or more of: cancelling a request for funds from a third-party fund source, and requesting funds from another third-party fund source.

20. The method of claim 14, wherein the events of the plurality of secondary events comprise one or more of: a bank wire transfer, an internal funds transfer, and an ACH transfer.

21. The method of claim 14, wherein the event rules are based on one or more of: a predefined relationship between a directed event entity and one or more of the entities controlling one or more of the fund sources, and a predefined relationship between two or more of the entities controlling one or more of the fund sources.

22. The method of claim 14, wherein generating an interactive map further comprises defining one or more DE entity display objects representing an entity that is a party to the directed event, the DE entity display objects having a visual feature representing DE entity attributes, wherein the DE entity attribute for a given party comprises one or more of: an account name, an account number, an account balance, an account location, a financial institution associated with the account, an insured status of an account, a controlling entity name, a task completion status associated with an event, a fund release amount, a fund release date, an anticipated fund release date, a fund receipt amount, a fund receipt date, an anticipated fund receipt date.

23. The method of claim 22, wherein generating an interactive map comprises defining one or more SE entity display objects representing a secondary entity that is a party to a secondary event, and defining SE event display objects representing an event attribute of events of the plurality of secondary events, the SE event display objects having a visual feature representing event attributes, wherein the event attribute for a given event comprises one or more of: an event sequence, an event type, an event fund source, an event fund destination, and an event status.

24. The method of claim 23, wherein generating an interactive map further comprises defining fund source display objects representing a source attribute of third-party fund sources of the plurality of third-party fund sources, the source display objects having a visual feature representing source attributes, wherein the source attribute for a given third-party fund source comprises one or more of: an account name, an account number, an account balance, an account location, a financial institution associated with the account, an insured status of an account, a controlling entity name, third-party fund source contact information, a task completion status associated with an event, a fund release amount, a fund release date, an anticipated fund release date, a fund receipt amount, a fund receipt date, an anticipated fund receipt date.

25. The method of claim 24, wherein the fund source display objects may be selectively shown or hidden within the interactive map based upon a user's selection of the DE entity display object associated with the party awaiting funding from third-party fund sources associated with such fund source display objects.

26. The system of claim 1, wherein the non-transitory machine readable medium further stores computer program instructions which, when executed by the processor, cause the system to:
detect receipt of a wire transfer from the second party to the first party, wherein the wire transfer from the second party to the first party comprises a repayment of at least a portion of the funds transferred from the first party to the second party in the directed event;
issue, responsive the detected receipt of the wire transfer from the second party to the first party, a command to cause execution of one or more wire transfers from the first party to one or more of the third-party fund sources in accordance with a repayment priority.

27. The method of claim 14, further comprising:
detecting receipt of a wire transfer from the second party to the first party, wherein the wire transfer from the second party to the first party comprises a repayment of at least a portion of the funds transferred from the first party to the second party in the directed event;
issuing, responsive the detected receipt of the wire transfer from the second party to the first party, a command to cause execution of one or more wire transfers from the first party to one or more of the third-party fund sources in accordance with a repayment priority.

* * * * *